(12) United States Patent
Nashiki

(10) Patent No.: US 7,105,974 B2
(45) Date of Patent: Sep. 12, 2006

(54) AC MOTOR HAVING STATOR WINDINGS FORMED AS LOOP COILS, AND CONTROL APPARATUS FOR THE MOTOR

(75) Inventor: Masayuki Nashiki, Komaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/982,881

(22) Filed: Nov. 8, 2004

(65) Prior Publication Data

US 2005/0099082 A1    May 12, 2005

(30) Foreign Application Priority Data

Nov. 7, 2003   (JP)  ............... 2003-378403
May 24, 2004   (JP)  ............... 2004-152743

(51) Int. Cl.
*H02K 3/00* (2006.01)
*H02K 1/00* (2006.01)
*H02K 12/21* (2006.01)

(52) U.S. Cl. ............ 310/185; 310/156.08; 310/156.53; 310/156.56; 310/216

(58) Field of Classification Search ............... 310/162, 310/164, 165, 156.08, 156.53, 156.56, 216, 310/254, 179, 180, 184, 185, 188, 206–208
See application file for complete search history.

(56) References Cited

U.S. PATENT DOCUMENTS 4,700,097 A * 10/1987 Kawada et al. ............. 310/162
4,947,065 A * 8/1990 Ward et al. ................. 310/44
6,211,593 B1 * 4/2001 Nashiki .................. 310/156.33
6,765,321 B1   7/2004 Sakamoto
6,847,147 B1 * 1/2005 Gladkov ..................... 310/179
6,919,663 B1 * 7/2005 Iles-Klumpner ....... 310/156.53
2002/0070627 A1 * 6/2002 Ward et al. ................ 310/254
2002/0190585 A1  12/2002 Sakamoto
2005/0012427 A1   1/2005 Seki et al.

FOREIGN PATENT DOCUMENTS

| JP | A 06-261513 | 9/1994 |
| JP | A 07-067312 | 3/1995 |
| JP | A 07-075302 | 3/1995 |
| JP | A 07-095756 | 4/1995 |
| JP | A 07-227075 | 8/1995 |
| JP | A 07-336989 | 12/1995 |
| JP | A 2003-009500 | 1/2003 |
| JP | A-2005-20981 | 1/2005 |

* cited by examiner

*Primary Examiner*—Tran Nguyen
(74) *Attorney, Agent, or Firm*—Oliff & Berridge, PLC

(57) ABSTRACT

A synchronous AC motor has a stator with stator poles arranged as a plurality of circumferentially extending stator pole groups, with each stator pole group having a pair of corresponding circumferentially extending loop-configuration stator windings disposed adjacent on either side or a single such winding disposed adjacent at one side, adjacent stator pole groups being mutually circumferentially displaced by a fixed amount corresponding to a specific electrical phase angle. A rotating magnetic field is produced by applying respective polyphase AC voltages to the windings, such that currents of mutually opposite direction flow in each pair.

39 Claims, 22 Drawing Sheets

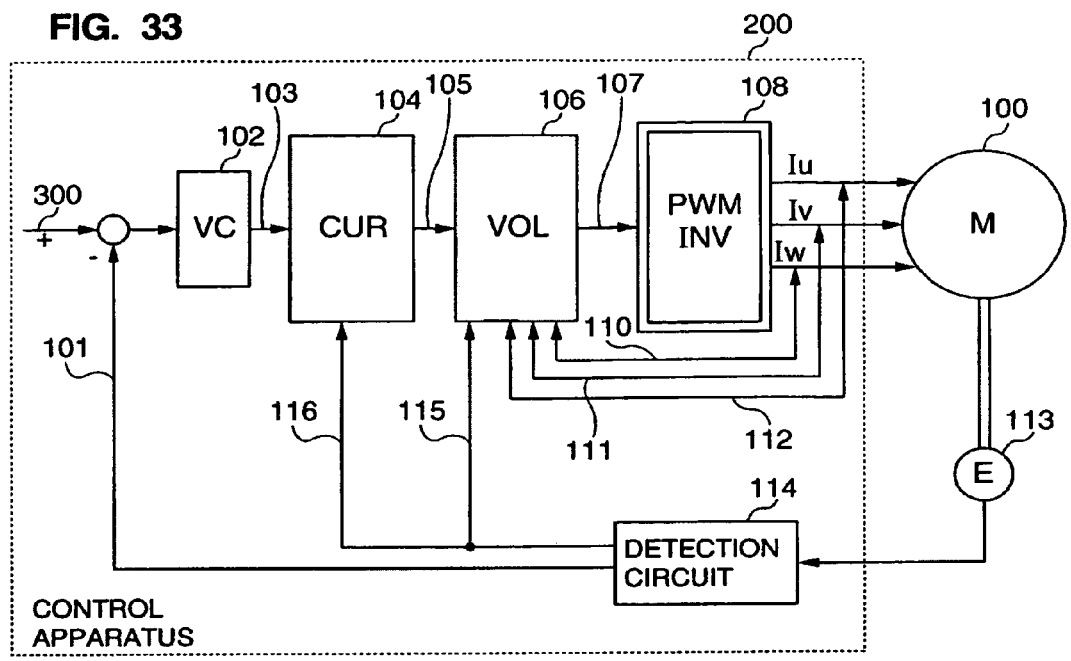
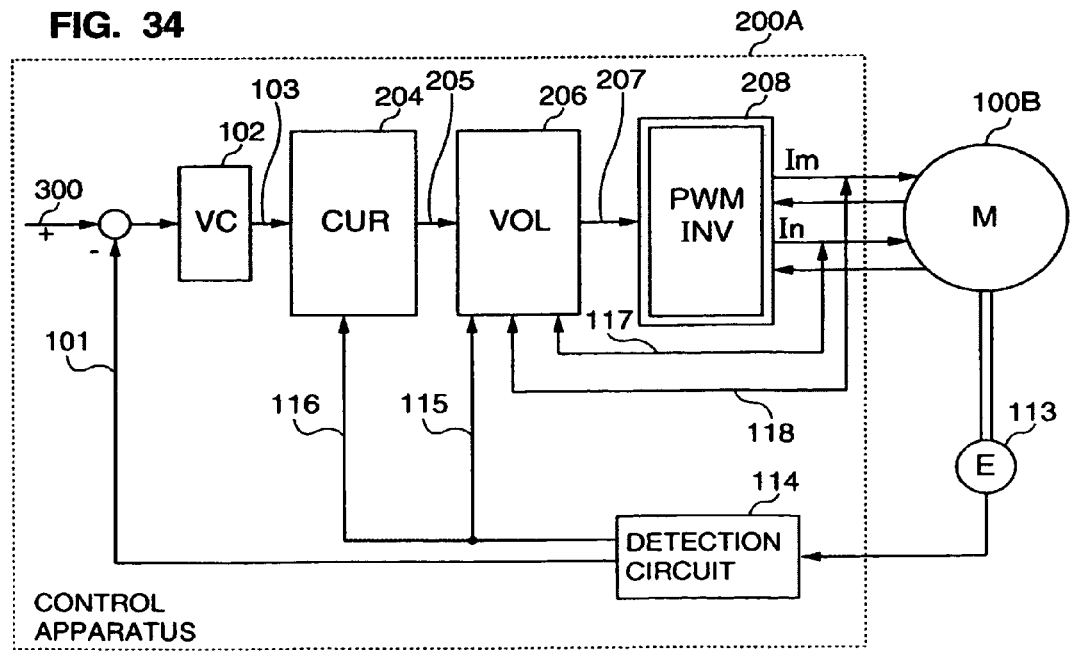

AC MOTOR HAVING STATOR WINDINGS FORMED AS LOOP COILS, AND CONTROL APPARATUS FOR THE MOTOR

BACKGROUND OF THE INVENTION

1. Field of Application

The present invention relates to a synchronous AC motor, suitable for installation in a motor vehicle, and to a control apparatus for the AC motor.

2. Description of Prior Art

In the prior art, types of synchronous AC motor, and in particular types of brushless AC motor, are known which have stator windings formed as closely packed layers of conductors that are wound around the stator poles, for example as described in Japanese Patent Laid-open No. 6-261513 (page 3, and FIGS. 1 to 3), designated in the following as reference document 1. FIGS. 40 and 41 are cross-sectional views taken along the motor shaft and at right angles to the motor shaft, respectively, showing the general configuration of such a prior art type of brushless motor. This example is a 4-pole 6-slot type of brushless motor, having compensating windings formed on the stator, and with respective stator windings of the phases (referred to in the following simply as the phase windings) being wound around the stator poles. FIG. 42 is a conceptual view taken around 360° of the inner circumference of the stator (with such a type of view being referred to in the following as a developed circumferential view), illustrating how the stator windings are disposed with respect to the corresponding stator poles. The extent of the (mechanical) 360° developed circumferential view of FIG. 42 is equivalent to an electrical angle of 720°. The rotor 2 of this brushless motor is formed with two permanent magnets designated by numeral 7 which have N (north) polarity at the outer surface of the rotor 2, as the N poles of the rotor 2, and two permanent magnets designated by numeral 8 which have S (south) polarity at the outer surface of the rotor 2, as the S poles of the rotor 2, with the N poles 7 and S poles 8 being arranged in successive alternation around the circumferential periphery of the rotor 2 as shown. The stator 4 has U-phase stator poles TBU1 and TBU1 having the U-phase stator windings WBU1, WBU2 respectively wound thereon, and similarly has V-phase stator poles TBV1 and TBV1 having the V-phase stator windings WBV1, WBV2 respectively wound thereon, and has W-phase stator poles TBW1 and TBW1 having the W-phase stator windings WBW1, WBW2 respectively wound thereon.

Such a configuration of brushless motor is widely used at the present time in both industrial and domestic applications. However such a brushless motor has a complex construction, due to the need to form windings around each of the respective stator poles, with each of the windings being disposed in the interior of a stator slot. Hence, the manufacturing productivity is low.

In addition, it is difficult to produce such a type of brushless motor in a compact size, or to manufacture it at low cost.

It should be noted that although the present invention is described in the following with reference to a brushless type of synchronous AC motor in which rotor poles are formed by permanent magnets, or to a reluctance type of synchronous AC motor, the principles of the invention are equally applicable to a synchronous AC motor having field windings that are driven by an excitation current to produce the magnetic flux for the rotor poles.

SUMMARY OF THE INVENTION

It is an objective of the present invention to overcome the above problems of the prior art by providing a synchronous AC motor, and in particular a brushless motor, having a simple configuration and ease of manufacture, which can be made compact in size, can operate with high efficiency, and has low manufacturing cost. It is a further objective to provide a control apparatus for such a motor.

To achieve the above objectives, the invention provides a synchronous AC motor comprising a rotor having a plurality of magnetic poles formed circumferentially, with N poles and S poles successively alternating, a stator having a plurality of stator poles formed around its inner circumference, arranged as N stator pole groups (where N is a plural integer) with each of adjacent pairs of the N stator pole groups mutually differing in circumferential position by a fixed amount, and a plurality of loop-configuration stator windings formed circumferentially on the stator, with each loop-configuration stator winding disposed immediately adjacent to a corresponding one of the N stator pole groups (with respect to the rotor axis direction).

Use of such loop-configuration stator windings is made possible by the fact that with a conventional form of stator winding, with each winding being wound a number of times around each of a plurality of stator poles in succession, those stator winding portions which are located at positions intermediate between adjacent poles produce magnetizing forces that mutually cancel, since respective currents of equal value and opposite direction flow through these portions of the stator windings. Hence, this is equivalent to a condition in which no current flows through these portions of stator windings, so that these can be omitted. Use of loop-configuration stator windings according to the present invention has the advantages that the amount of copper required to form the stator windings can be substantially reduced (since the aforementioned winding portions that are located between each pair of adjacent stator poles in a prior art type of brushless motor are omitted), and in addition, increased output torque and increased efficiency can be achieved for the motor. Furthermore the manufacturing cost can be lowered, e.g., with manufacture being simplified since it is not necessary to coil the stator windings around the stator poles, and the motor can be made lighter in weight.

Moreover, due to the fact that the aforementioned winding portions that are located between each pair of adjacent stator poles in a prior art type of synchronous AC motor are omitted, it becomes possible to increase the number of stator poles of a synchronous AC motor according to the present invention, by comparison with a prior art type of such motor.

Moreover, due to the fact that the locations of the stator poles can be distributed in a balanced manner, along both the rotor axis direction as well as around the inner circumference of the stator, as opposed to having a small number of stator poles that are located along a single circumferential path, further advantages are obtained. Specifically, the forces of magnetic attraction acting on the stator by the rotor poles are applied in a distributed manner, thereby reducing the tendency for the stator to become deformed by these forces. Hence, vibration and noise which results from such deformation can be reduced.

Such a synchronous AC motor can be configured with each of the stator pole groups having a corresponding pair of loop-configuration stator windings disposed closely adjacent on either side (with respect to the rotor axis direction), with mutually opposite directions of current flow through that pair of windings. Such a configuration has the advantage that all of the stator poles can be utilized as efficiently as possible, with respect to magnetic flux generation.

Alternatively, such a synchronous AC motor can be configured such that the two stator pole groups that are respectively located at opposing outer ends of the stator (i.e., with respect to the rotor axis direction) each has only a single corresponding loop-configuration stator windings disposed immediately adjacent thereto, located on the opposite side of that stator pole group from the corresponding outer end of the stator. Each of the remaining (i.e., intervening) stator pole groups is provided with a corresponding pair of loop-configuration stator windings, disposed closely adjacent and located on either side, with currents of mutually opposite direction being respectively passed through these.

Such a configuration is made possible due to the fact that if each of the stator pole groups is provided with a corresponding pair of loop-configuration stator windings respectively located closely adjacent on either side, the two outermost loop-configuration stator windings (i.e., with respect to the rotor axis direction) are located substantially outside the rotor core, in a region having a high level of magnetic resistance. Thus, these windings do not have a significant electromagnetic effect upon the motor operation, and so can be eliminated without any serious lowering of the output torque or output power of the motor. This has the advantage that the amount of copper required for the stator windings can be further reduced, and increased efficiency can be achieved. In addition, mounting the stator windings onto the stator is simplified, so that assembling of the motor during manufacture is correspondingly simplified. In addition, the motor can be made lighter in weight and of more compact size.

If the two outermost loop-configuration stator windings are eliminated as described above, this leaves a configuration in which each adjacent pair of stator pole groups has a pair of loop-configuration stator windings located between them. As a further alternative, it is possible to replace each of these pairs of windings by a single loop-configuration stator winding, i.e., so that only a single winding is disposed between each adjacent pair of stator pole groups. If drive voltages to produce currents of appropriate phase and amplitude are respectively applied to these stator windings, as described hereinafter, similar operation can be achieved to that in which pairs of stator windings are utilized. This further simplifies the construction and assembling of such a motor, and also enables a reduction of the amount of copper for forming the stator windings.

In general, with the loop-configuration stator windings driven by N-phase AC voltages, loop-configuration stator windings that are disposed immediately adjacent to respectively different ones of the N stator poles groups of a synchronous AC motor according to the present invention are driven by AC voltages that respectively differ in phase angle by 360/N degrees.

To implement such a synchronous AC motor as a brushless motor, the rotor can be provided with a plurality of permanent magnets, disposed circumferentially at equal intervals around the rotor, alternating between permanent magnets which have an N pole disposed at the outer surface of the magnet and permanent magnets which have an S pole disposed at their outer surface. In particular, the rotor poles can be readily implemented by forming each such permanent magnet with an arc-shaped outer contour and fixedly attaching the magnets with respect to the rotor shaft.

Alternatively, a plurality of permanent magnets can be disposed circumferentially at equal intervals around the rotor, mounted in the rotor such that each of the N and S poles of each magnetic produces a corresponding N and S pole at the rotor surface, with the magnets arranged such that these poles occur in successive alternation around the circumference of the rotor.

From another aspect, such a synchronous AC motor is configured with the stator poles respectively protruding from an inner circumferential surface of the stator, and with the stator having a plurality of pole pieces disposed on that inner circumferential surface, at locations that are not occupied by the stator poles. This serves to absorb leakage flux from the rotor poles that reaches the stator surface, i.e., allowing that flux to readily link back to the rotor poles, and enables the output torque to be increased.

From another aspect, the core portions of the stator and/or the rotor are at least partly produced by molding, e.g., press-forming, a magnetic metal powder that is a soft magnetic material. Since the surface of each particle of such a material can readily be processed beforehand by oxidation, etc., to be rendered electrically insulating, flows of eddy currents within the magnetic circuits in any direction in three dimensions can be prevented. Iron losses in the magnetic circuits can thereby be reduced, so that higher efficiency of operation is achieved.

Furthermore such a method of construction has the advantage that stator components which are to constitute parts of a magnetic circuit can be formed into substantially their respective final shapes before assembly of the motor, with the amount of machining required to manufacture such components being greatly reduced or eliminated. Such components can thus be manufactured at low cost, for producing magnetic fields in three dimensions, even if they are complex in shape.

From another aspect, the stator poles of the motor may be arranged at respective circumferential locations on the stator such that a specific relative amount of displacement in the circumferential direction exists between each adjacent pair of the N stator pole groups, with the specific amount of displacement being equivalent to an electrical angle of 360/N degrees. In that way, by applying respective polyphase AC voltages to the loop-configuration windings corresponding to the various stator pole groups, a rotating magnetic field can be produced for thereby producing rotation of the rotor.

Furthermore with such a synchronous AC motor, within each of the N stator pole groups, the stator poles thereof can be respectively formed in specific shapes for making the waveforms of respective unit voltages of the stator pole groups become substantially mutually identical, making the respective amplitudes of the unit voltages become substantially mutually identical (i.e., where the unit voltage represents a rate of angular rotation of magnetic flux that is linked to the stator pole group concerned) and for maintaining a mutual difference in phase of substantially 360/N degrees between the respective stator pole groups. Such a measure enables the amount of torque ripple produced by such a synchronous AC motor to be reduced, without reducing the maximum values of magnetic flux produced by the stator poles, i.e., without reducing the average value of torque of the motor. In addition, this enables the outer diameter of the motor to be reduced, and also serves to reduce the amount of leakage flux between adjacent stator poles.

Furthermore, when it is required to reduce m-th order torque ripple, i.e., torque ripple that is an m-th order harmonic (where m is an integer), the stator poles within each of the N stator pole groups can be divided into n sub-groups, and a specific amount of relative position displacement in the circumferential direction of the stator established between the sub-groups, with the specific amount of relative position displacement being equivalent to a phase shift that is an integral multiple of 360/(m×n) degrees of electrical angle (i.e., where the circumferential pitch of the stator poles within each stator pole group corresponds to an electrical angle of 360 degrees). In that way, when for example it is known that a substantial amount of m-th order torque ripple is liable be produced during operation of the motor, the motor can be designed such as to effectively reduce that specific type of torque ripple.

Alternatively, a similar effect can be achieved, for reducing such m-th order torque ripple, by dividing the N poles of the rotor into n sub-groups and also the S poles of the rotor into n sub-groups, and establishing a specific amount of relative position displacement in the circumferential direction between the sub-groups, with the specific amount of relative position displacement being equivalent to a phase angle that is an integral multiple of 360/(m×n) degrees.

In some cases, a net amount of magnetizing force may be produced by the combination of respective magnetizing forces generated by current flow through some of the loop-configuration stator windings, that acts along the rotor axis direction. Hence, from another aspect, such a synchronous AC motor can be provided with an auxiliary winding disposed closely adjacent to the rotor shaft, e.g., coaxial with the shaft axis, with an AC current being supplied to the auxiliary winding that has appropriate values of frequency, phase and amplitude for producing a magnetizing force in the auxiliary winding acting along the axial direction of the shaft to counteract a net amount of magnetizing force that is produced by a combination of respective currents that flow through the loop-configuration stator windings. In that way, the magnetizing force acting along the rotor axis direction can be eliminated.

From another aspect, the invention provides a control apparatus for controlling a synchronous AC motor of the form described above in which each of the stator pole groups has a corresponding pair of loop-configuration stator windings disposed closely adjacent on each side, with mutually opposite directions of current flow through that pair of windings, or of the form described above in which each of the two axially outermost ones of the stator pole groups is provided with only a single corresponding (i.e., closely adjacent) loop-configuration stator winding and each of the intervening stator pole groups is provided with a corresponding pair of adjacent loop-configuration stator windings. The control apparatus operates to control the amplitude I of each of respective currents that flow in the loop-configuration stator windings to a value whereby a total of respective values of torque T that are produced by the N stator pole groups becomes equal to a predetermined command value of torque.

Specifically, such a control apparatus comprising means for calculating respective values of the torque T for each of the N stator pole groups, as W×E×I, where E is the rate of angular rotation of magnetic flux that is linked to the each stator pole group, and W is a total number of turns of the loop-configuration stator windings that correspond to the stator pole group.

By using such a control apparatus to control the respective levels of supply current that flow in the loop-configuration stator windings, a synchronous AC motor according to the present invention can readily be controlled to produce a required target value of torque.

A control apparatus can similarly be configured for controlling a synchronous AC motor as described above, having a stator configuration in which a single winding is disposed between each adjacent pair of stator pole groups. Such a control apparatus operates to control the amplitude I of each of (N−1) current that respectively flow in the loop-configuration stator windings to a value whereby a total of respective values of torque T that are produced based on the (N−1) loop-configuration stator windings becomes equal to a target value of torque.

Specifically, such a control apparatus comprising means for calculating respective values of torque T corresponding to each of the (N−1) loop-configuration stator windings as W×E×I, where E is the rate of angular rotation of magnetic flux that is linked to the each stator pole group, and W the number of turns of each loop-configuration stator winding.

As a further aspect of the invention, one or more of the loop-configuration stator windings may be shaped as a loop that extends partially around the inner circumference of the stator and partially extends along the rotor axis direction, i.e., with one or more of the stator poles protruding through the central aperture of the loop. This has the advantage that assembling of the stator can be simplified.

As a further aspect, such a synchronous AC motor may be formed with the respective pole faces of the stator poles each having a dimension, as measured along the rotor axis direction, which is longer than the pitch of the stator pole groups. This enables the stator poles to be formed around the inner circumference of the stator without mutual position interference between the poles of adjacent stator pole groups, so that construction of the stator is simplified. In addition, it becomes possible to use a large number of stator poles, so that the output torque of the motor can be increased.

It is furthermore possible to couple together a plurality of synchronous AC motors according to the present invention, e.g., having a common motor shaft, or having the motor shafts mutually coupled by belts or gears, etc., to drive a common load. In that way, it becomes possible to drive large-capacity loads, by flexibly combining a number of motors, as required.

BRIEF DESCRIPTION OF THE DRAWINGS

FIG. 33 is a block system diagram of an example of a control apparatus for the 3-phase brushless motor of FIG. 1;

FIG. 34 is a block system diagram of an example of a control apparatus for an alternative (2-phase) form of the brushless motor of FIG. 1, having stator windings as shown in FIG. 13;

DESCRIPTION OF PREFERRED EMBODIMENTS

Figure 1:
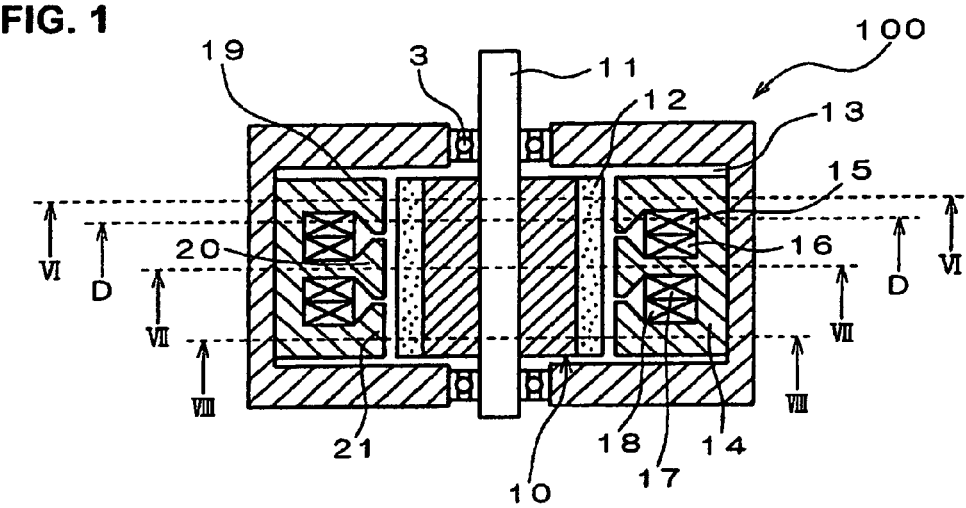
FIG. 1 is a cross-sectional view of an embodiment of a 3-phase brushless motor, taken in a plane passing through the rotor axis.

FIG. 1 is a cross-sectional view taken along the motor shaft of an embodiment of a brushless motor, designated by numeral 100. This is a 3-phase 8-pole motor having a rotor shaft 11 mounted on bearings 3, a rotor 10 having permanent magnets 12, and a stator 14, with these being enclosed in a housing 61.

Figure 2:
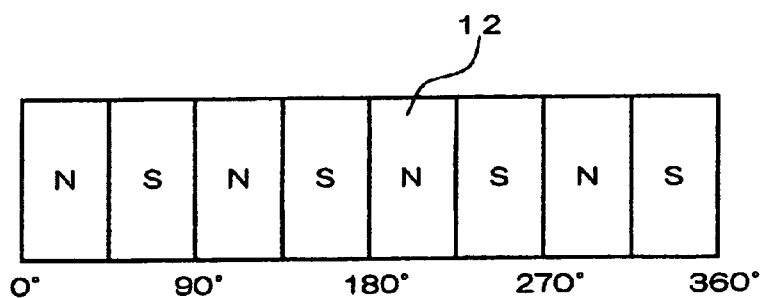
FIG. 2 is a developed circumferential view of the outer periphery of the rotor of the brushless motor of FIG. 1.

The rotor 10 has the permanent magnets 12 disposed circumferentially around its periphery, with N poles and S poles arranged in successive alternation, as shown in the developed circumferential view of FIG. 2, taken around the outer periphery of the rotor 10. The 360° circumference of the rotor 10 is equivalent to an electrical angle of 1440°.

Figure 3:
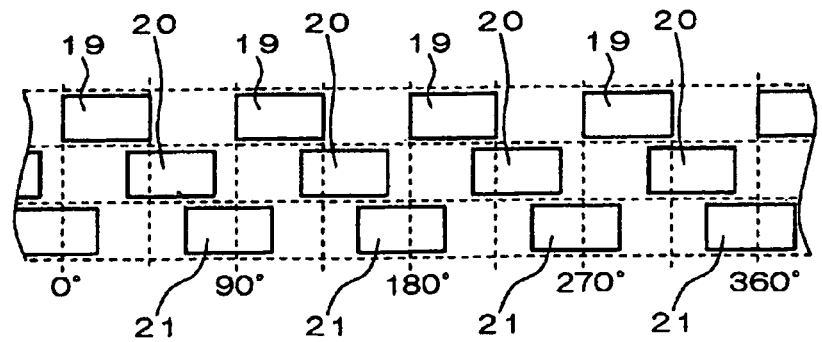
FIG. 3 is a developed circumferential view of the inner periphery of the stator of the brushless motor of FIG. 1.

The stator 14 is provided with four U-phase stator poles 19, four V-phase stator poles 20, and four W-phase stator poles 21, each of which projects radially inward towards the periphery of the rotor 10. FIG. 3 is a developed circumferential view of the stator 14, illustrating the position relationships between these stator poles. As shown, the U-phase stator poles 19 are arranged at regular spacings, around a common circumferential path. The V-phase stator poles 20 are similarly arranged around a common circumferential path, adjacent to that of the U-phase stator poles 19, and the W-phase stator poles 21 are around a common circumferential path, adjacent to that of the V-phase stator poles 20. In the following, the set of four U-phase stator poles 19 will be referred to as the stator pole group 19, the set of four V-phase stator poles 20 as the stator pole group 20, and the set of four W-phase stator poles 21 as the stator pole group 21. Of these, the stator pole group 19 and the stator pole group 21, which are located at outer end positions (with respect to the direction of the rotor shaft 11) will be referred to as the edge position stator pole groups, while the stator pole group 20 will be referred to as the intermediate stator pole group.

As shown in FIG. 3, the stator pole groups 19, 20, 21 are respectively mutually displaced by a specific amount in the circumferential direction, and also along the rotor axis direction. In this example, the amount of circumferential displacement is a (mechanical) angle of 30°, which is equivalent to an electrical angle (i.e., phase difference) of 120°, since the circumferential stator pole pitch (within each stator pole group) corresponds to a phase change of 360°.

The broken-line outlines shown in FIG. 3 represent respective positions of the permanent magnets 12 of the rotor 10 (i.e., for the case of one specific angular position of the rotor 10), disposed adjacent to and immediately opposite the permanent magnets 12 of the stator 14.

The pitch of the permanent magnets 12 (i.e., the angular displacement between two adjacent N poles, or between two adjacent S poles) corresponds to an electrical angle of 360°. Similarly, as mentioned above, the pitch of the stator poles within each stator pole group is also equivalent to an electrical angle of 360°.

Figure 4:
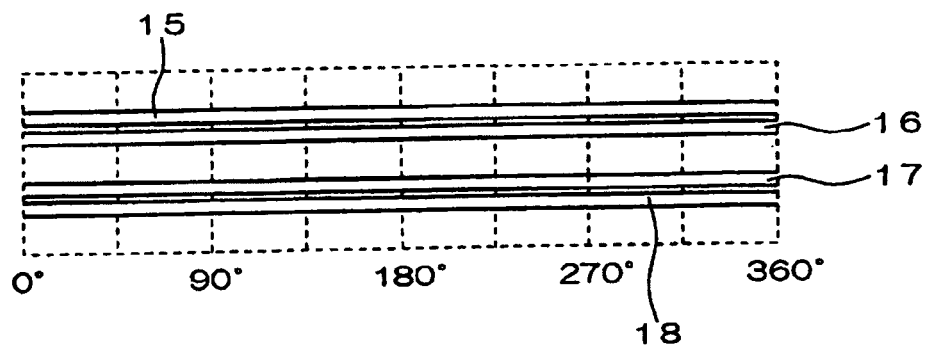
FIG. 4 is a developed circumferential view showing stator windings of the brushless motor of FIG. 1.

A U-phase stator winding 15 and a V-phase stator winding 16 are disposed successively (along the rotor axis direction) between the stator pole group 19 and the stator pole group 20 of the stator 14, i.e., with the U-phase stator winding 15 and V-phase stator winding 16 being respectively adjacent to the stator pole group 19 and the stator pole group 20, while a V-phase stator winding 17 and a W-phase stator winding 18 are similarly successively disposed, with the V-phase stator winding 17 closely adjacent to the stator pole group 20 and the W-phase stator winding 18 closely adjacent to the stator pole group 21. This is shown in FIG. 4, which is a developed circumferential view for illustrating the manner in which these windings are arranged on the stator 14. Each of the U-phase stator winding 15, V-phase stator winding 16, V-phase stator winding 17 and W-phase stator winding 18 is formed with a loop configuration, and extends for 360° around an inner circumference of the stator 14.

3-phase AC currents that successively differ in phase by 120°, referred to in the following as Iu, Iv and Iw, flow in the U-phase stator winding 15, the V-phase stator winding 16, the V-phase stator winding 17 and the W-phase stator winding 18 respectively. A direction of current flow in a phase winding (at any particular instant) that is clockwise (as seen looking along the direction of the motor shaft) will be arbitrarily designated as the positive direction of current flow, current flow in the counterclockwise direction being designated as the negative direction. It will be assumed that a negative current (−Iu) flows in the U-phase stator winding 15. In that case, a positive current (+Iv) flows in the V-phase stator winding 16, while a negative current (−Iv) flows in the V-phase stator winding 17, and a positive current (+Iw) flows in the W-phase stator winding 18.

0029

Figure 5:
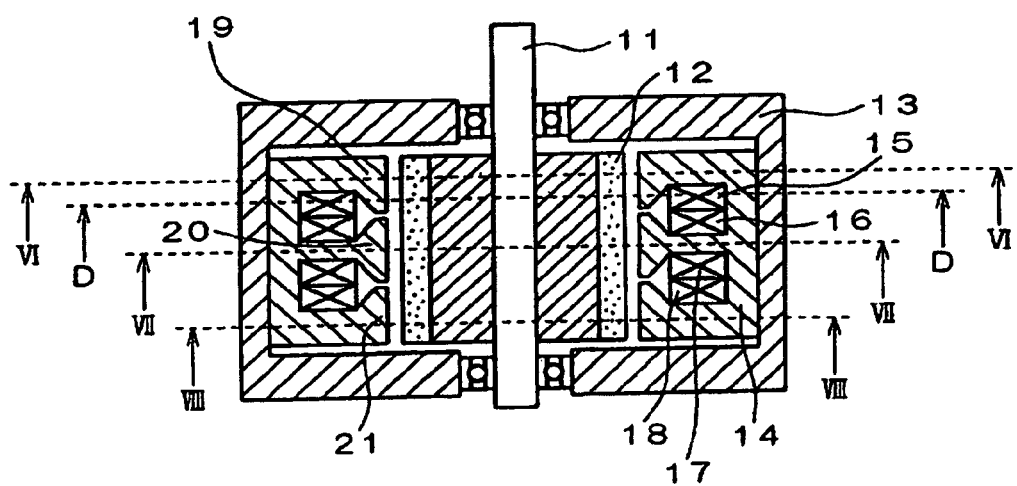
FIG. 5 is a cross-sectional view corresponding to FIG. 1, for use in describing methods of assembling the stator of the brushless motor of FIG. 1.
Figure 6:
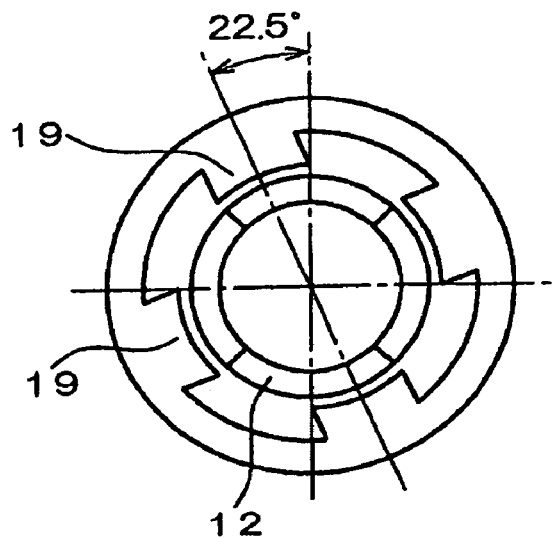
FIG. 6 is a cross-sectional view taken at right angles to the rotor axis direction, through a line VI—VI in FIG. 5.
Figure 7:
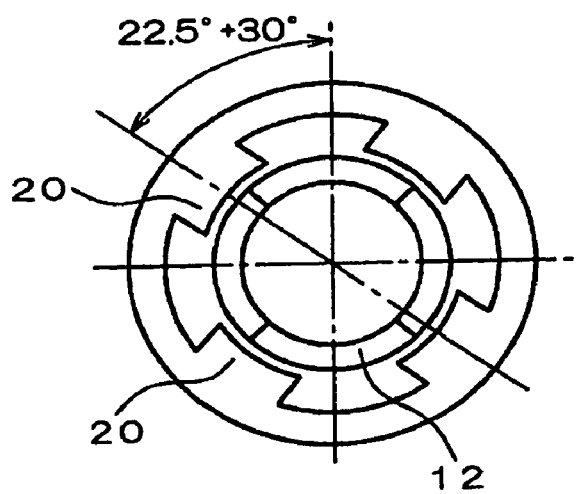
FIG. 7 is a cross-sectional view taken at right angles to the rotor axis direction, through a line VII—VII in FIG. 5.
Figure 8:
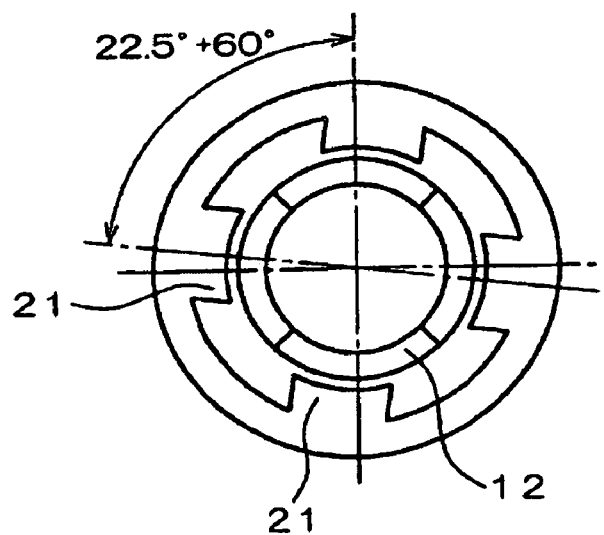
FIG. 8 is a cross-sectional view taken at right angles to the rotor axis direction, through a line VIII—VIII in FIG. 5.

The configuration of the stator poles and the phase windings will be described in greater detail in the following, using the cross-sectional view of the brushless motor 100 shown in FIG. 5, taken parallel to the shaft axis. FIG. 6 is a simplified cross-sectional view taken in a plane passing through the line VI—VI in FIG. 5, at right angles to the rotor axis direction. FIG. 7 is a similar cross-sectional view taken in a plane passing through the line VII—VII in FIG. 5, and FIG. 8 is a similar cross-sectional view taken in a plane passing through the line VIII—VIII in FIG. 5. As shown in these diagrams, each of the poles in the stator pole group 19, the stator pole group 20 and the stator pole group 21 has a radially inward-protruding configuration, and as described above there is a phase difference of 120°, corresponding to a mechanical angular difference of 30°, between the poles of one stator pole group and those of the immediately adjacent group, i.e., between the stator pole group 19 and the stator pole group 20, and between the stator pole group 20 and the stator pole group 21.

Figure 9:
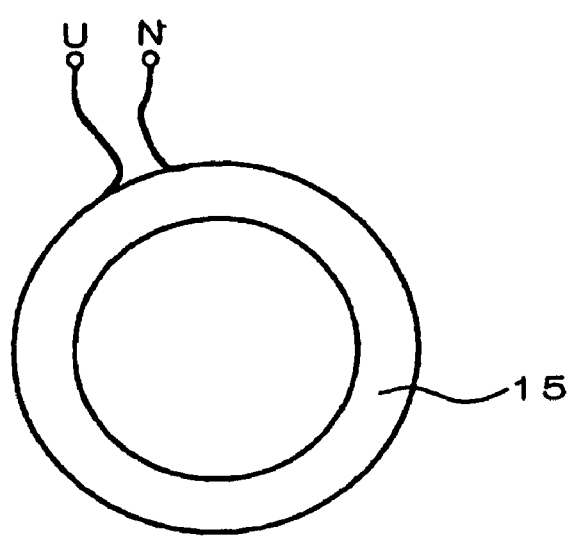
FIGS. 9 and 10 are diagrams illustrating the general form of a stator winding of the brushless motor of FIG. 1.
Figure 10:
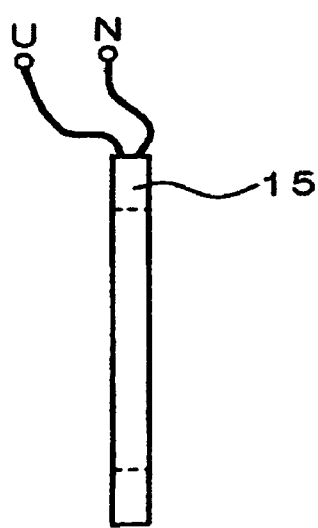

FIGS. 9 and 10 are diagrams illustrating the physical configuration of the U-phase stator winding 15. As shown, this is in the form of a circular loop, with a first terminal that will be referred to as the winding start terminal U and a second terminal that will be referred to as the winding end terminal N. Each of the V-phase stator winding 16, V-phase stator winding 17 and W-phase stator winding 18 has a similar configuration, and each of the V-phase stator winding 16 and V-phase stator winding 17 will be referred to as having a winding start terminal V and a winding end terminal N, while the W-phase stator winding 18 has a winding start terminal W and a winding end terminal N. Assuming that the phase windings are connected in a 3-phase Y configuration, each of the winding end terminals N of the U-phase stator winding 15, V-phase stator winding 16, V-phase stator winding 17 and W-phase stator winding 18 are mutually connected. The currents Iu, Iv, Iw that flow in the phase windings 15, 16, 17 and 18 serve to control the level of torque that is developed between the stator poles 19, 20, 21 of the respective phases and the permanent magnets 12 of the rotor 10, with the torque being determined based phase relationships between these currents. In addition, the currents are controlled such that Iu+Iv+Iw=0.

Figure 11:
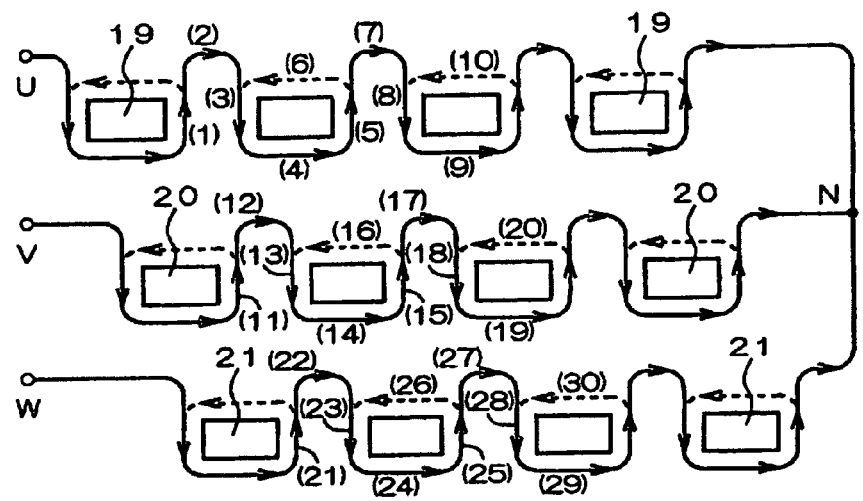
FIG. 11 is a developed circumferential view of the outer faces of stator poles of a brushless motor, for use in describing the principles of utilizing respective loop-configuration windings as stator windings in place of conventional stator windings.

The relationships between the phase currents Iu, Iv, Iw and the magnetizing forces that are respectively produced in the stator poles 19, 20, 21 by these phase currents will be described in the following. FIG. 11 is a developed circumferential view corresponding to FIG. 3 described above, for use in describing the arrangement of the respective phase windings, as seen from the air gap side of the rotor 10. Firstly, as indicated by the broken-line portions (6), (10), etc., the U-phase winding could be wound around the circumference of each of the stator poles 19 along the same direction, so that a magnetizing force that is in the same direction would produced in each of the U-phase stator poles 19. For example, the U-phase winding that is wound on the one of the U-phase stator poles 19 that is the second from the left, as seen in FIG. 11, is formed of a conductor having portions designated as (3), (4), (5) and (6) that are wound (in that order) around that one of the U-phase stator poles 19. Conductor portions that constitute connecting leads between adjacent ones of the U-phase stator poles 19 are designated as (2) and (7), etc., and these have no electromagnetic effect.

The current that flows in such a U-phase winding will be examined in the following, to explain the basic principles whereby it becomes possible to utilize loop-configuration stator windings rather than conventional types of stator winding that are wound successively around respective stator poles as in the prior art example of FIG. 42. Currents that are of equal magnitude but opposite direction flow in the conductor portions (1) and (3) of the U-phase winding shown in FIG. 11, so that the ampere-turns of these will mutually cancel out, so that this is equivalent to a current flow of zero through these conductor portions. Similarly, the ampere-turns of the conductor portions (5) and (8) also mutually cancel, creating a condition equivalent to a current flow of zero through these conductor portions. Due to the fact that the currents which flow through conductor portions disposed between adjacent ones of the U-phase stator poles 19 are mutually cancelled, there is no actual need for such currents to flow. Hence, these conductor portions can be omitted.

As a result, the same effect is obtained as if a U-phase current Iu flows in a loop around a circumferential path in the stator 14, through the conductor portions such as (10) and (6), etc., while at the same time a current of equal magnitude and opposite direction (–Iu) also flows in a loop around a circumferential path in the stator 14, through the conductor portions such as (4) and (9), etc. Thus, these conductor portions can be replaced by a pair of loop-configuration stator windings, disposed on either side of the group of stator poles 19, i.e., with each of the loops extending circumferentially around the interior of the stator.

Furthermore the phase current Iu that flows through the conductor portions (6) and (10), is equivalent in it effect to a current that flows in a loop-configuration stator winding that is located substantially on an end face (i.e., with respect to the motor shaft direction) of the stator 14, i.e., substantially outside the stator core. The exterior of the stator core consists of air or other material that has a low value of magnetic permeability, so that the flow of current Iu through that external loop path has almost no electromagnetic action on the brushless motor 100. Hence, a loop-configuration stator winding that corresponds to these conductor portions (6), (10), etc., can be omitted, without affecting the operation of the motor.

As a result of the above, the action of the loop-configuration U-phase stator winding 15 shown in FIGS. 4 and 5 is equivalent to that of the U-phase winding shown in FIG. 11 that is wound around the respective circumferences of the stator pole 19.

Moreover in the same way as for the U-phase winding, the V-phase winding shown in FIG. 11 is wound around each of the V-phase stator poles 20. The currents that flow in the conductor portions 11 and 13 are of equal magnitude and opposite direction, so that the respective ampere-turns of these conductor portions will mutually cancel. Hence, this is equivalent to a condition in which no current flows through either of these conductor portions. Similarly, the currents that flow in the conductor portions 15 and 18 are of equal magnitude and opposite direction, so that the respective ampere-turns of these conductor portions will mutually cancel.

Thus, the same effect is obtained as if a V-phase current Iv flows in a loop around a circumferential path in the stator 14, through the conductor portions (20) and (16), while at the same time a current of equal magnitude and opposite direction (–Iu) also flows in a loop around a circumferential path in the stator 14, through the conductor portions (14) and (19).

As a result of the above, the combination of actions of the two loop-configuration V-phase windings 16 and 17 shown in FIGS. 4 and 5 is equivalent to that of the V-phase winding shown in FIG. 11, that is wound around the respective circumferences of the stator poles 20.

Similarly, the W-phase winding shown in FIG. 11 is wound around each of the W-phase stator poles 21. The currents that flow in the conductor portions 21 and 23 are of equal magnitude and opposite direction, so that the respective ampere-turns of these conductor portions will mutually cancel. Hence, this is equivalent to a condition in which no current flows through either of these conductor portions. Furthermore the currents that flow in the conductor portions 25 and 28 are of equal magnitude and opposite direction, so that the respective ampere-turns of these conductor portions will mutually cancel.

As a result, the same effect is obtained as if a W-phase current Iw flows in a loop around a circumferential path in the stator 14 through the conductor portions (30) and (26), while at the same time a current of equal magnitude and opposite direction (–Iw) also flows in a loop around a circumferential path in the stator 14, through the conductor portions (24) and (29).

However the current flow through the conductor portions (24) and (29) is equivalent in its effect to a W-phase current (–Iw) that flows in a loop path that is substantially external to the stator core. Thus, for the same reasons as described above in relation to the U-phase winding, a loop-configuration stator winding that corresponds to these conductor portions (24) and (29) can be omitted, without affecting the operation of the motor, i.e., it is not necessary to provide a loop-configuration stator winding carrying the phase current (–Iw).

However it should be noted that it would be equally possible to incorporate such outermost U an W-phase stator windings, if desired.

As can be understood from the above, it is possible to utilize stator windings that each have a simple loop configuration, on the stator 14, to provide the same effects as stator windings that are wound around each of the stator poles, i.e., with the above example, six loop-configuration stator windings could be used to provide the same effect as three phase windings of conventional type that are respectively wound around each of the U-phase stator poles 19, each of the V-phase stator poles 20, and each of the W-phase stator poles 21. Furthermore, as described above, of these six loop-configuration stator windings, the two stator windings that are located at opposing ends (with respect to the motor shaft axis direction) of the set of three groups of stator poles 19, 20, 21 and so are located substantially outside the stator core, can be omitted, without significant effect upon the action of the stator windings.

As a result, the amount of copper that is required to constitute the stator windings of the brushless motor 100 can be substantially reduced, by using a set of four loop-configuration stator windings in place of a set of three conventional stator windings, in this example. Efficiency can thereby be increased, and increased torque can also be attained.

Furthermore, due to the fact that it is not necessary to provide conductor portions (as part of the stator windings) that only serve to convey current between adjacent stator poles, such as the conductor portions (2), (7), etc., shown in the example of FIG. 11, more space is available around the inner circumference of the stator to accommodate stator poles. Hence, it becomes possible to use a greater number of stator poles than has been possible in the prior art, while at the same time achieving improved operating efficiency, by eliminating a large number of conductor portions that only serve to convey current between adjacent stator poles in a prior art type of brushless motor.

Furthermore since the overall configuration of the stator windings can be simplified, the productivity of manufacturing such a type of brushless motor can be substantially increased by comparison with the prior art, so that lower manufacturing costs can be achieved.

The magnetic fluxes φu, φv and φw that pass through the U, V and W-phase stator poles flow together through the back yoke section of the stator, and the total of these three-phase magnetic flux values is zero, i.e., φu+φv+φw=0. With the prior art configuration shown in FIG. 41, there is a total of six stator poles, i.e., two poles corresponding to each of the three phases. The electromagnetic action and amount of torque generated by each of these poles is the same as that of the poles of the brushless motor 100 of the above embodiment. However, due to the configuration of the prior art brushless motor, it is impossible to omit parts of the stator windings, or to simplify the arrangement of the stator windings, as is made possible with the brushless motor 100 of the above embodiment.

Figure 12:
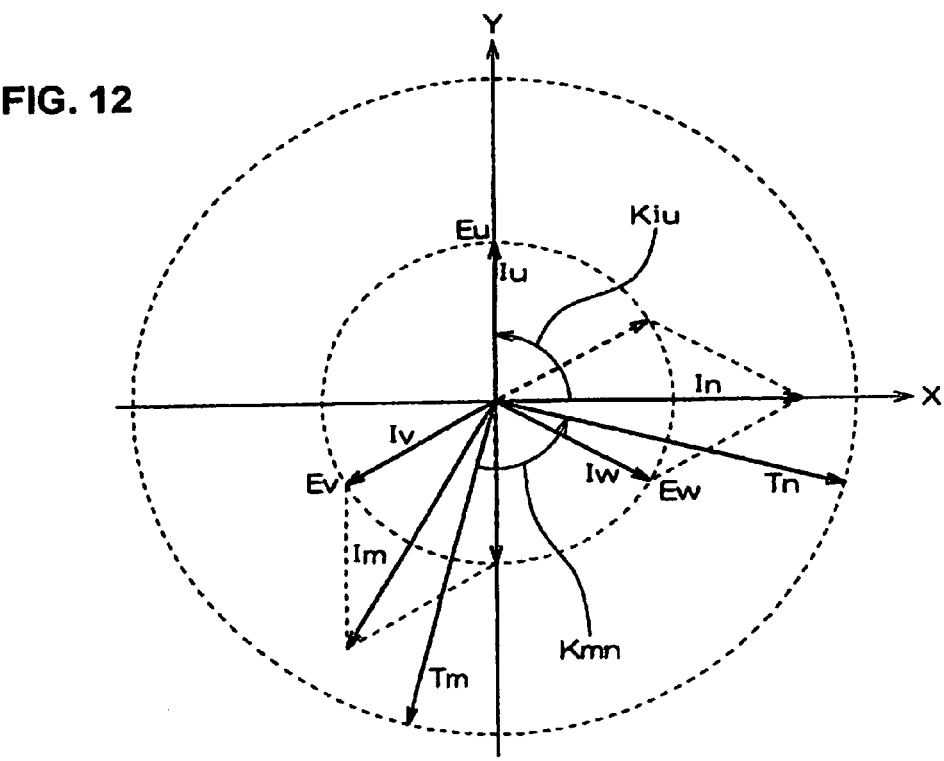
FIG. 12 is a vector diagram showing relationships between values of stator winding current, voltage and output torque, for the brushless motor of FIG. 1.

The operation of the brushless motor 100 will be described in greater detail in the following. FIG. 12 is a vector diagram showing the relationships between current flows, voltages, and output torque, for this embodiment. The X-axis and Y-axis are the real and imaginary axes, respectively. Angles in the clockwise direction, with respect to the X-axis, will assumed to be the phase angles of vectors.

In the following, the rate of angular rotation of the magnetic fluxes φu, φv, φw in the stator poles 19, 20, 21 of the stator 14, of the respective phases, will be designated as the respective unit voltages Eu, Ev, Ew of these phases, expressed as: Eu=dφu/dθ, Ev=dφv/dθ, Ew=dφw/dθ

FIG. 3 illustrates how the relative circumferential positions of the stator pole groups 19, 20, 21 of the stator 14 are mutually displaced. As shown, each stator pole 19 is displaced by an amount equal to a mechanical angle of 30°, i.e., an electrical angle of 120° from the immediately adjacent one of the stator poles 20, while each stator pole 20 is displaced by that same electrical angle of 120° from the immediately adjacent one of the stator poles 21. The unit voltages Eu, Ev, Ew, developed across one turn of each of the windings 15 to 18, are shown in FIG. 12 as 3-phase voltages.

Assuming that rotation occurs at a fixed rate of dθ/dt=S1, and designating the number of turns constituting each of the loop-configuration stator windings 15, 16, 17, 18 as Wu, Wv, Ww respectively, with these being assumed to have a common value of Wc, the respective induced voltages Vu, Vv, Vw in the loop-configuration stator windings 15, 16, 17, 18 can be expressed as follows:

$$Vu = Wu \times (-d\phi u/dt) \quad (1)$$
$$= -Wu \times d\phi u/d\theta \times d\theta/dt$$
$$= -Wu \times Eu \times S1$$

$$Vv = -Wv \times Ev \times S1 \quad (2)$$

$$Vw = -Ww \times Ew \times S1 \quad (3)$$

Specifically, the relationship between the windings and the voltages are as follows. The unit voltage Eu of the U-phase is an inverse-direction voltage that is developed in one turn of the U-phase stator winding 15 shown in FIGS. 1 and 4. The U-phase voltage Vu is an inverse-direction voltage that is developed in the U-phase stator winding 15. The V-phase unit voltage Ev is a voltage that is developed across a series-connected combination of one turn of the V-phase stator winding 16 and one turn of the V-phase stator winding 17 (i.e., wound in the opposite direction to the one turn of the V-phase stator winding 16). The V-phase voltage Vv is a voltage that is developed across the series-connected combination of the V-phase stator winding 16 and the V-phase stator winding 17 (wound in the opposite direction to the winding 16). The unit voltage Ew of the W-phase is an inverse-direction voltage that is developed in one turn of the W-phase stator winding 18, and the W-phase voltage Vw is an inverse-direction voltage that is developed in the W-phase stator winding 15.

In order to achieve a high efficiency of generating torque, with the brushless motor 100, it is necessary that respective phase currents Iu, Iv, Iw be in phase with the unit voltages Eu, Ev, Ew. In FIG. 12 it is assumed that Iu, Iv, Iw are respectively in phase with the unit voltages Eu, Ev, Ew. Hence, to simplify the torque diagram, the voltage vector for a phase and the current vector for that phase are shown by the same arrow.

Designating the output power of the brushless motor 100 as Pa, and the values of output power corresponding to the U, V and W phases as Pu, Pv, Pw respectively, these can be expressed as follows:

$$Pu = Vu \times (-Iu) = Wu \times Eu \times S1 \times Iu \quad (4)$$

$$Pv = Vv \times Iv = Wv \times Ev \times S1 \times Iv \quad (5)$$

$$Pw = Vw \times Iw = Ww \times Ew \times S1 \times Iw \quad (6)$$

$$Pa = Pu + Pv + Pw = Vu \times Iu + Vv \times Iv + Vw \times Iw \quad (7)$$

Designating the output torque of the brushless motor 100 as Ta, and the respective torque values for the phases as Tu, Tv, Tw, the following are true:

$$Tu = Pu/S1 = Wu \times Eu \times Iu \quad (8)$$

$$Tv = Pv/S1 = Wv \times Ev \times Iv \quad (9)$$

$$Tw = Pw/S1 = Ww \times Ew \times Iw \quad (10)$$

$$Ta = Tu + Tv + Tw \quad (11)$$
$$= Wu \times Eu \times Iu + Wv \times Ev \times Iv + Ww \times Ew \times Iw$$
$$= Wc \times (Eu \times Iu + Ev \times Iv + Ew \times Iw)$$

Figure 40:
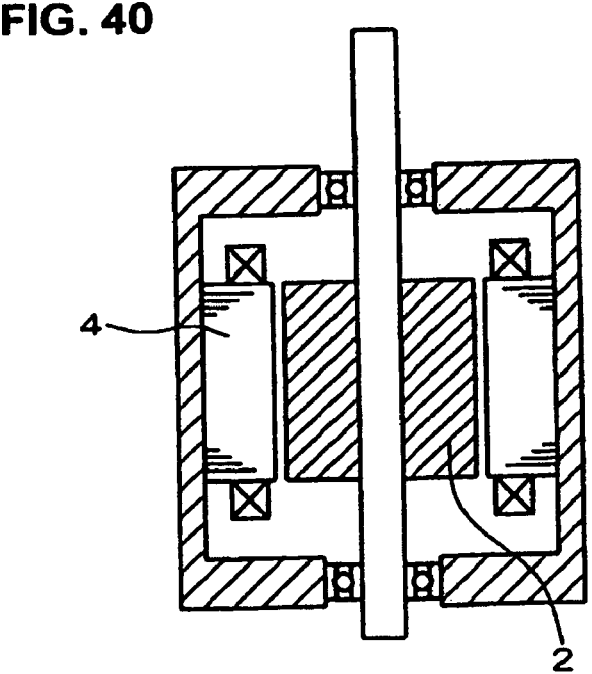
FIG. 40 is a cross-sectional view, taken in a plane passing through the rotor axis, of an example of a prior art type of brushless motor.
Figure 41:
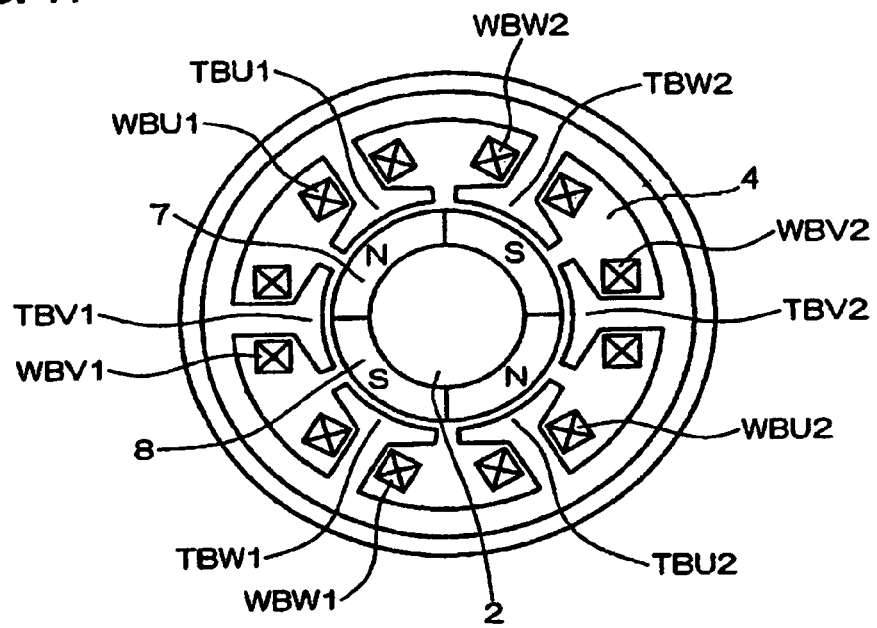
FIG. 41 is a cross-sectional view taken at right angles to the rotor axis direction, of the prior art brushless motor of FIG. 40.
Figure 42:
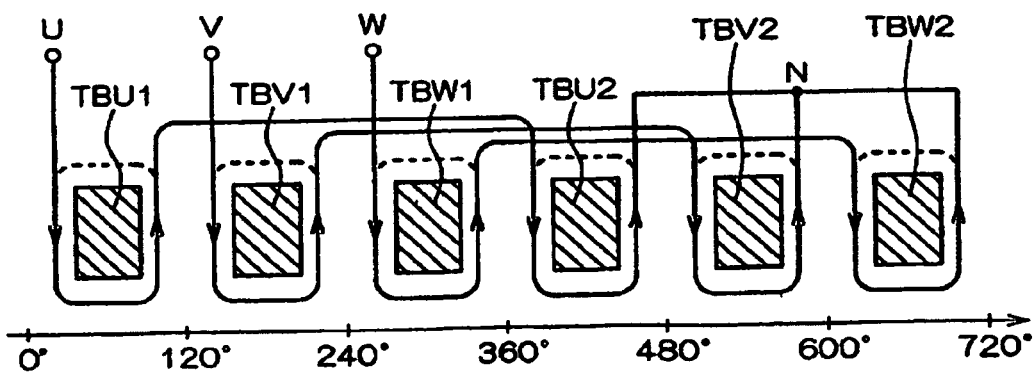
FIG. 42 is a developed circumferential view illustrating the relationships between stator poles and stator windings in the prior art brushless motor of FIG. 40.
Figure 43:
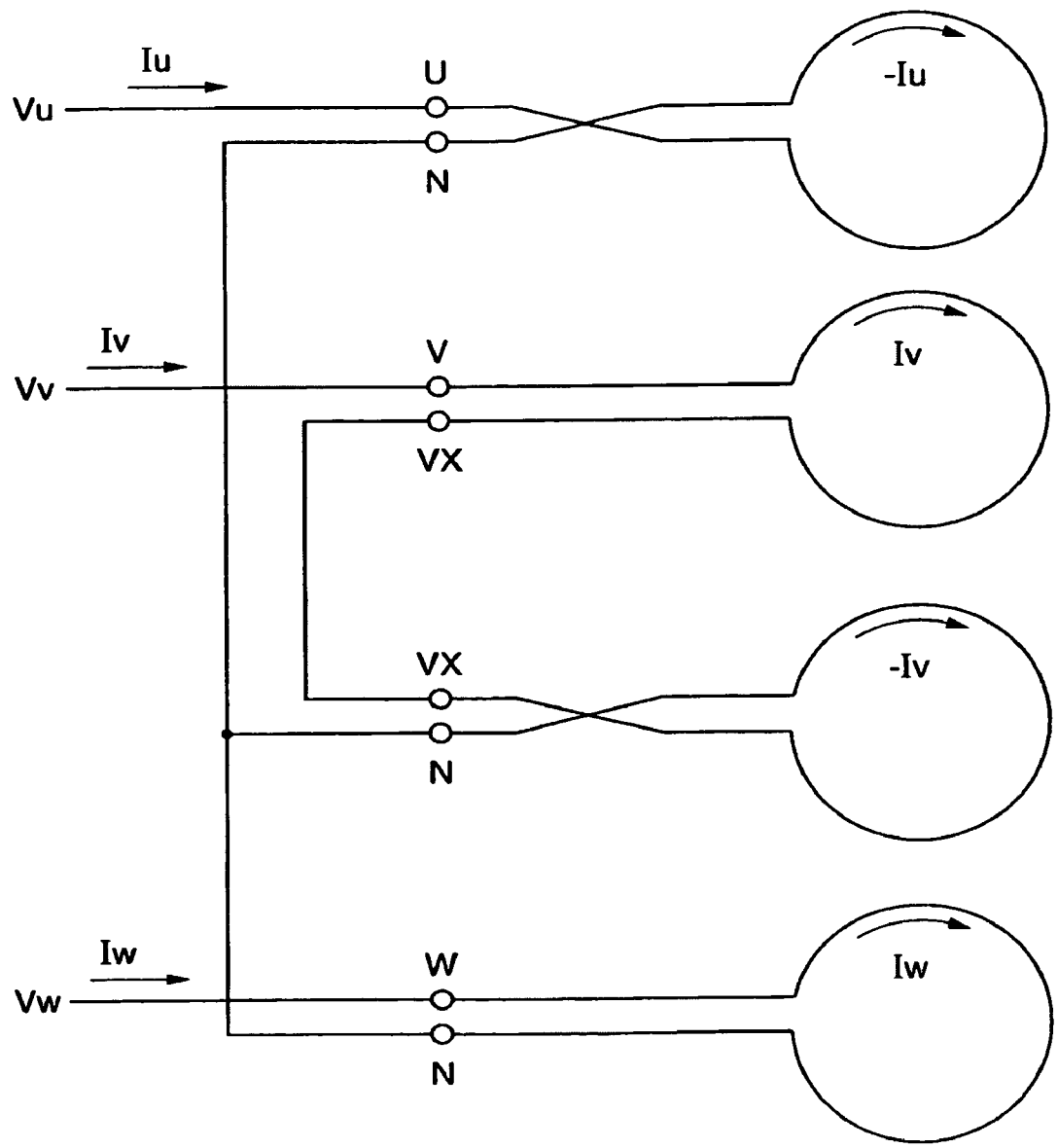
FIG. 43 is a conceptual circuit diagram for illustrating the connection arrangement of the U, V and W stator windings of the first embodiment, shown in FIGS. 1 and 4.

A vector diagram of values of voltage, current and torque for the brushless motor 100 of this embodiment is identical to a corresponding vector diagram for a prior art type of brushless motor of the form shown in FIGS. 40 to 42.

As described above referring to FIG. 11, no loop-configuration windings are utilized in the above embodiment that have an equivalent effect to the U-phase stator winding portions such as (6) and (10) and W-phase stator winding portions such as (24) and (29) of a conventional form of stator winding, that are located substantially outside the stator core. However with the stator of a modified form or the above embodiment, although not shown in the drawings, a second loop-configuration U-phase stator winding, through which a supply current is passed in the opposite direction to that of the U-phase winding 15 (e.g., that is wound in the opposite direction to the U-phase winding 15), is provided on the opposite side of the stator pole group 19 from the U-phase winding 15 shown in FIG. 3. Similarly, a second loop-configuration W-phase stator winding, through which a supply current is passed in the opposite direction to that of the W-phase winding 18 is provided on the opposite side of the stator pole group 21 from the W-phase winding 18. With that embodiment, the stator poles 19 and 21 are shaped such as to respectively accommodate these additional loop-configuration windings, i.e., at the same circumferential positions as for the stator windings 15 to 18.

Another modified form of the above embodiment, for providing improved efficiency, will now be described. With the above embodiment, as shown in FIG. 4, the stator windings 15 and 16 are respective loop-configuration windings disposed between the stator pole group 19 and the stator pole group 20. These two loop-configuration windings can be replaced by a single loop-configuration winding. Similarly, the stator windings 17 and 18, disposed between the stator pole group 20 and the stator pole group 21, can be replaced by a single loop-configuration winding.

Figure 13:
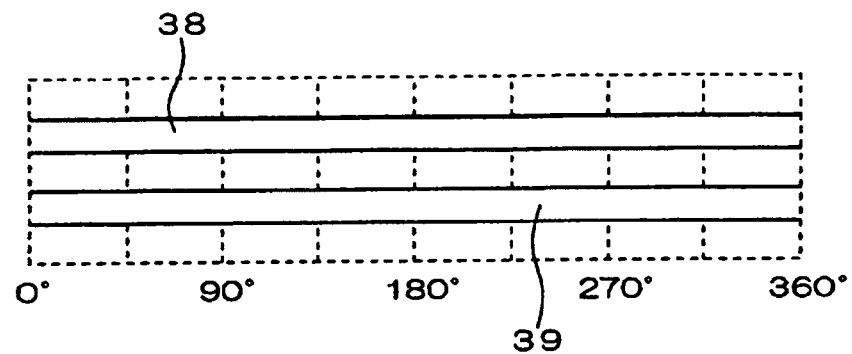
FIG. 13 is a conceptual developed circumferential view showing stator windings of an alternative form of the brushless motor of FIG. 1, operating as a 2-phase motor having two loop-configuration stator windings.

FIG. 13 is a developed circumferential view of the stator windings in this modified form of the above embodiment, in which the stator windings 15 and 16 are replaced by the single loop-configuration M-phase winding 38 and the stator windings 17 and 18 are replaced by the single loop-configuration N-phase winding 39. The M-phase current Im (=−Iu+Iv) which flows in the M-phase winding 38 is equal to the sum of the respective currents (−Iu) and Iv that flow in the U-phase stator winding 15 and the V-phase stator winding 16 respectively of the above embodiment. Hence, the condition of the magnetic flux that is produced by the M-phase winding 38 is identical to that of the combined magnetic fluxes that are produced by the U-phase stator winding 15 and the V-phase stator winding 16 respectively, so that the single M-phase winding 38 is electromagnetically equivalent to the combination of the U-phase stator winding 15 and V-phase stator winding 16.

Similarly, the N-phase current In (=−Iv+Iw) which flows in the N-phase winding 39' is equal to the sum of the respective currents (−Iv) and Iw that flow in the V-phase stator winding 17 and the W-phase stator winding 18 respectively of the above embodiment. Hence, the condition of the magnetic flux that is produced by the N-phase winding 39 is identical to that of the combined magnetic fluxes that are produced by the V-phase stator winding 17 and the W-phase stator winding 18 respectively, so that the single N-phase winding 39 is electromagnetically equivalent to the combination of the V-phase stator winding 17 and W-phase stator winding 18.

The above is illustrated in the vector diagram of FIG. 12, in which the unit voltage Em of the M-phase winding 38 and the unit voltage En of the N-phase winding 39 are respectively expressed as follows:

$$Em = -Eu = -d\phi u/d\theta$$

$$En = Ew = d\phi w/d\theta$$

In addition, vector equations for the power P, torque T are as follows:

$$Vm = Wc \times Em \times S1 \qquad (12)$$

$$Vn = Wc \times En \times S1 \qquad (13)$$

$$Pm = Vm \times Im \qquad (14)$$
$$= Wc \times (-Eu) \times S1 \times (-Iu + Iv)$$
$$= Wc \times Eu \times S1 \times (-Iu + Iv)$$

-continued
$$Pn = Vn \times In = Wc \times Ew \times S1 \times (-Iv + Iw) \qquad (15)$$

$$Pb = Pm + Pn = Vu \times (-Iu + Iv) + Vw \times (-Iv + Iw) \qquad (16)$$

$$Tm = Pm/S1 = Wc \times (-Eu) \times (-Iu + Iv) \qquad (17)$$

$$Tn = Pn/S1 = Wc \times Ew \times (-Iv + Iw) \qquad (18)$$

$$Tb = Tm + Tn \qquad (19)$$
$$= Wc \times ((-Eu \times Im) + Ew \times In)$$
$$= Wc \times (-Eu \times (-Iu + Iv) + Ew \times (-Iv + Iw)$$
$$= Wc \times Eu \times Iu + Wc \times Iv \times (-Eu - Ew) + Wc \times Ew \times Iw$$
$$= Wcx(Eu \times Iu + Ev \times Iv + Ew \times Iw) \qquad (20)$$

$$Eu + Ev + Ew = 0 \qquad (21)$$

In equation (11) above, the torque that is expressed by the equation is a 3-phase torque. However equation (19) expresses a 2-phase torque. The method of expressing these two torque equations are different, however by developing equation (19), equation (20) can be obtained, so that the equations (11) and (19) are mathematically equivalent. In the case in which the voltages Vu, Vv, Vw and the currents Iu, Iv, Iw constitute a balanced three-phase AC arrangement, the torque Ta expressed by equation (11) is a constant value. Under the same conditions, the torque Tb that is obtained from equation (19) is the sum of two squared functions of sinusoids such that the phase difference Kmn between Tm and Tn becomes 90°, so that the torque Tb is constant.

The equation (19) applies to a 2-phase motor, whereas the equations (11) and (21) are in a form which express a 3-phase motor, although identical values of torque are obtained from these equations. However in the case of equation (19), when a current of (−Iu+Iv) is passed through the M-phase winding 38, and currents −Iu and Iv respectively pass through the U-phase stator winding 15 and the V-phase stator winding 16 respectively, then although these are electromagnetically equivalent cases, the amounts of copper that are required to constitute the stator windings are respectively different for these two cases.

As shown in the vector diagram of FIG. 12, the real-axis component of the current Im that passes through the M-phase winding 38 is reduced by an amount corresponding to Im multiplied by cos 30°, i.e., the amount of copper losses that result from the current flow through the M-phase winding 38 can be reduced to 75% of the amount of copper losses that occur due to currents that flow through the U-phase stator winding 15 and V-phase stator winding 16, so that the total amount of copper losses can be reduced by 25% as a result of using the alternative form of the stator windings that is shown in FIG. 13. Thus, substantially improved efficiency of operation of the brushless motor can be achieved.

A method of improving the performance of the brushless motor 100 of FIG. 1 will now be described. The basic principles of the brushless motor 100 are that the magnetic flux of the portions of the permanent magnets 12 that are disposed immediately opposite respective poles 19, 20, 21 of the stator 14 passes through these stator poles, while magnetic flux of other parts of the permanent magnets 12 do not act upon the stator poles 19, 20, 21 (or, at least, only has a very small effect). However there is a certain amount of leakage flux in the gaps between adjacent ones of the permanent magnets 12, that passes into the air gap between the stator and rotor, and this leakage flux has an adverse effect upon the action of the stator poles 19, 20, 21, tending to reduce the amount of torque that is developed by the brushless motor 100.

Figure 14:
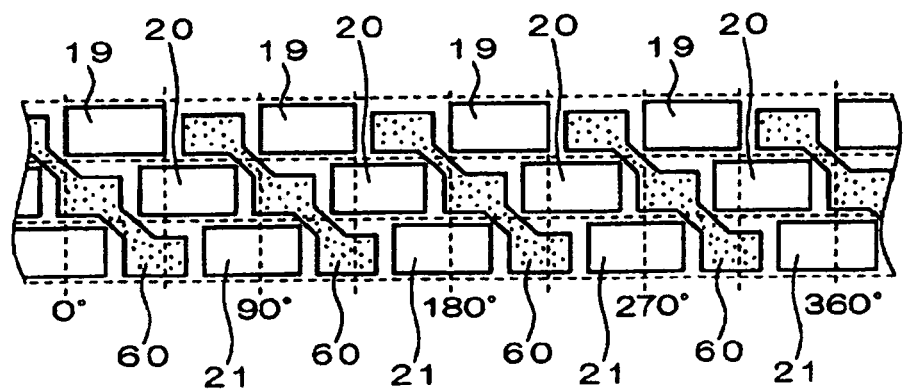
FIG. 14 is a developed circumferential view of the inner periphery of a first alternative form of the stator of the brushless motor of FIG. 1, having stator pole pieces to absorb leakage flux.

FIG. 14 is a developed circumferential view of the poles 19, 20, 21 of the stator 14, as seen from the rotor 10, showing a modification of the stator 14 to reduce the above problem. As shown, pole pieces (i.e., interpoles) 60 formed of a magnetic material are disposed on the surface of the stator 14 from which the stator poles protrude, in the spaces that are not occupied by the stator poles 19, 20, 21. In that way, the leakage flux that is produced from the permanent magnets 12 (i.e., which does not pass through the stator poles 19, 20, 21) is absorbed, preventing adverse effects of such leakage flux. The output torque of the brushless motor 100 can thereby be increased.

It should be noted that the interpoles 60 can be configured such that each flow of leakage flux between S and N poles of the permanent magnets 12, occurring at the pole faces of the permanent magnets 12, is absorbed by passing (i.e., looping) through the interpoles 60 themselves, or such that the leakage flux is absorbed by looping around through the back yoke region of the stator 14.

The configuration of the magnetic circuits of the brushless motor 100 of FIG. 1 will now be described. With this embodiment, since magnetic flux is produced by the stator poles of one phase (i.e., the poles of one of the stator pole groups) with the flux oriented in directions towards the other stator pole groups (i.e., towards stator poles of the other phases), a part of this magnetic flux becomes oriented along the axial direction of the rotor shaft 11. Thus, the magnetic flux produced by the stator poles of each stator pole group is oriented in three directions, i.e., along the axial direction of the rotor shaft 11, in the radial direction (i.e., radial with respect to the axis of the rotor shaft 11), and along a circumferential direction. In the prior art, in which a multi-layer coil structure on a magnetic armature is used to constitute the stator windings, the magnetic circuit of the stator windings is generally designed such that there is only a 2-dimensional magnetic flux path, since it is preferable that the amount of magnetic flux that passes in a direction at right angles to the layers of the windings be as small as possible, in order to minimize eddy currents and so increase the efficiency of the motor.

However with a brushless motor such as the embodiment of FIG. 1, it is possible to provide 3-dimensional magnetic flux paths within the stator, while minimizing the occurrence of eddy current flow, and resultant excessive current flow in the stator windings. This can be achieved while avoiding the complex methods of construction of the stator core and the stator poles that are required in the prior art to limit the magnetic flux paths to substantially only two dimensions. Specifically, with the present invention, all or part of the stator 14 and also the rotor 10 (other than the permanent magnets 12) can be manufactured by press-forming (e.g., in metal molds) a magnetic powder material that is a soft magnetic substance, having the surfaces of the powder particles covered by a film of electrically insulating material, that is to say, with the magnetic powder being solidified by the molding process.

The formation of the thin film that has a high degree of electrical resistance can readily be achieved for example by using a suitable metal in powder form, which has been left exposed to the atmosphere to form an oxidized film upon the surfaces of the powder particles.

If necessary, after the elements of the stator 14 and rotor 10 have been first formed from a magnetic powder material by a molding process as described above, the resultant hardened molded pieces can be machined to the precise required shapes and dimensions.

Alternatively, each of the components of the stator 14 and the rotor 10 which are to carry magnetic circuits can be produced, in their final form, by directly machining solidified blocks of the magnetic powder material.

By using methods such as the above, it becomes possible to readily manufacture components of the brushless motor in which 3-dimensional magnetic flux paths can exist, without excessive lowering of efficiency due to eddy current losses, with the manufacture being capable of being performed at low cost even when the shapes which must be formed are relatively complex.

Specific possible methods of manufacturing the stator 14 of the brushless motor 100 will be described in the following, referring to FIG. 5. Firstly, the stator core of the stator 14 can be formed of three separate annular segments, with one segment extending from the upper part of the stator 14 as shown in FIG. 5 to a plane (perpendicular to the axis of the rotor shaft 11) that passes through a location between the lines VI and VII shown in FIG. 5, a second segment extending from the latter plane to a plane (perpendicular to the axis of the rotor shaft 11) that passes through a location between the lines VII and VIII, and a third segment that extends from the latter plane to the lower part of the stator 14 as shown in FIG. 5.

The aforementioned plane that passes through a location between the lines VI and VII is preferably located close to the slot apertures, e.g., located at a position intermediate between the stator pole groups 19 and 20 as seen in FIG. 3. Similarly, the aforementioned plane that passes through a location between the lines VII and VIII would be advantageously located between the stator pole groups 20 and 21, as seen in FIG. 3.

After these three annular segments of the stator core (incorporating the stator pole groups 19, 20, 21 respectively) have been formed, e.g., by a manufacturing process using molding of a magnetic powder as described above, they would be mutually attached, to form the configuration of the stator 14 shown in FIG. 5.

The loop-configuration stator windings 15, 16, 17 and 18 can be manufactured separately, before assembling the aforementioned three annular segments of the stator core. The stator windings 15 and 16 would be inserted into appropriate positions in the first and second of the three segments described above, and these two segments then mutually attached, while the stator windings 17 and 18 would be similarly inserted into appropriate positions in the second and third of the three annular segments described above, and these two segments then mutually attached, to thereby obtain the stator 14 with the loop-configuration stator windings 15 to 18 contained therein as illustrated in FIG. 5.

In that way the stator 14 can be readily manufactured, by simple processing operations.

Alternatively, instead of forming each of the loop-configuration stator windings 15, 16, 17 and 18 respectively separately from the segments of the stator core, these stator windings can be directly wound in the appropriate ones of the above-described three stator core segments, before these segments are mutually attached to form the completed stator 14.

In order to enable accurate assembling of the stator core segments into the completed stator core, appropriately shaped abutment faces are preferably be formed on each of the stator core segments, e.g., with one or more protrusions formed on the abutment face of a segment and with corresponding recesses formed in the abutment face of an adjacent segment, so that these will become correctly mutually aligned when brought together. Alternatively or in addition, attachment pins, and corresponding apertures or through-holes to receive the attachment pins, can be utilized to facilitate the process of assembling the stator core segments into the completed stator core.

As a further alternative, each of the aforementioned annular segments of the stator core can be further divided into a pair of annular sub-segments, with one of these having half of the poles of a stator pole group formed around the inner circumference thereof, at positions which alternate with successive gaps (each gap corresponding to one stator pole position), and the other segment having the remaining half of the poles of the stator pole group similarly formed around the inner circumference thereof. These two annular sub-segments can then be mutually attached to form a single segment which carries all of the poles of a stator pole group, located at appropriate circumferential positions.

Such a method of forming and assembling the stator, using sub-segments each of which carries only half of the poles of one stator pole group, is especially advantageous when the stator poles are of complex configuration and the above-mentioned process of manufacture using molding of a magnetic powder material is utilized. In that case, since each mold need only form alternate ones of the poles of a stator pole group, there is a reduced danger of interference between adjacent poles during the molding process, i.e., since these are spaced farther apart than would otherwise be the case. The molding process can thereby be facilitated.

As a further alternative configuration of the stator core for manufacturing purposes, it could be divided into an outer stator core peripheral portion (i.e., of cylindrical form), the U-phase stator pole group 19, the V-phase stator pole group 20 and the W-phase stator pole group 21, e.g., with the poles of each stator pole group being integrally formed around the inner circumference of an annular segment having an outer circumference that is smaller than the inner circumference of the aforementioned outer stator core peripheral portion.

With such an arrangement, each of the stator pole groups can be formed by press-molding of a magnetic powder material as described above, and then the stator core can be assembled by successively press-fitting each of the pre-formed stator pole groups into the cylindrical-configuration stator core peripheral portion, along the direction of the rotor axis, i.e., such that all of the poles of a stator pole group are moved into their final positions at the same time. Such a method can be advantageously used when the shapes of the stator poles have been made comparatively complex, in order to achieve a high level of output torque for the brushless motor 100.

It should be noted also that it would be possible to manufacture the stator core of the stator 14 by using an integral combination of a magnetic metal powder material and magnetic steel plate, rather than a magnetic metal powder material alone. In that case, the respective advantages of the two types of material, i.e., with respect to magnetic properties and mechanical strength, can be obtained. In particular, if directional silicon steel plate is used in such a combination, a high level of magnetic flux density along one direction can be achieved, while the magnetic metal powder material allows magnetic flux to pass through along directions in three dimensions. By combining such directional silicon steel plate and magnetic metal powder material, a stator can be produced which combines the respective advantages of both these types of material.

Alternative shapes of the stator poles of the brushless motor 100 of this embodiment will be described in the following, more specifically, alternative shapes for the portions of the stator poles that constitute the boundary with the air gap, i.e., the respective pole faces of the stator poles. The shapes of these has a strong effect on the torque characteristics of a brushless motor, and also affects the cogging torque ripple, and the torque ripple that results from flows of induced current. Stator pole configurations will be described whereby the waveform and the amplitude of the unit voltage (as defined hereinabove) will be substantially the same for each of the stator pole groups, and the unit voltages of the respective stator pole groups will differ successively in phase by an electrical angle that is substantially close to 120°. This is achieved by modifying the shapes of the pole faces in the respective stator pole groups appropriately.

Other than for the pole faces, the shapes of the stator poles can for example be basically as described referring to FIGS. 3 and 4, i.e., with the portion of each pole (the "tooth" portion) that is attached to the stator core being shaped to accommodate the corresponding loop-configuration stator winding on one side, or pair of corresponding windings on either side.

Figure 15:
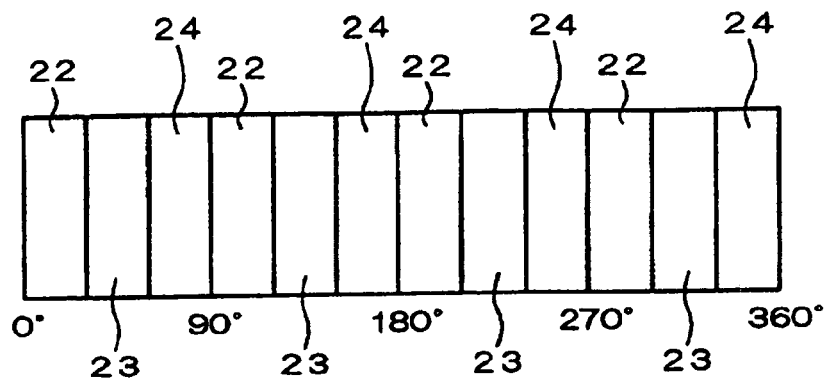
FIG. 15 is a developed circumferential view of the inner periphery of a third alternative form of the stator of the brushless motor of FIG. 1, having a modified configuration of stator poles.

FIG. 15 is a developed circumferential view of the inner periphery of a stator, showing an alternative arrangement of the stator poles of a brushless motor. In FIG. 15, there are three stator pole groups corresponding to respective phases, with the poles of these three groups respectively designated as 22, 23 and 24. In this example, the pole faces of the stator poles are oriented in parallel, along the rotor axis direction, and all of the stator poles that belong to the same group (i.e., to the same phase) are of identical pole face configuration. In the same way as for the example of FIG. 3 above, the stator pole groups are respectively displaced circumferentially with respect to one another by an amount corresponding to an electrical angle of 120° (i.e., where the circumferential pole pitch in each stator pole group corresponds to an electrical angle of 360°).

Such a configuration of the stator poles 22, 23, 24 enables each stator pole to be linked by a greater amount of magnetic flux from the rotor, but may result in a substantial amount of torque ripple being produced. However this can be reduced by forming each of the stator poles with a pole face having a surface contour that is of curved convex shape (as viewed along the direction of the rotor axis). This causes the electromagnetic action at the boundaries between adjacent poles vary in a smoother manner, so that torque ripple is reduced.

In FIG. 15, angular values along the horizontal direction express mechanical angles in the circumferential direction, with the distance from the left to right sides in the diagram corresponding to a (mechanical) angle of 360°.

Figure 16:
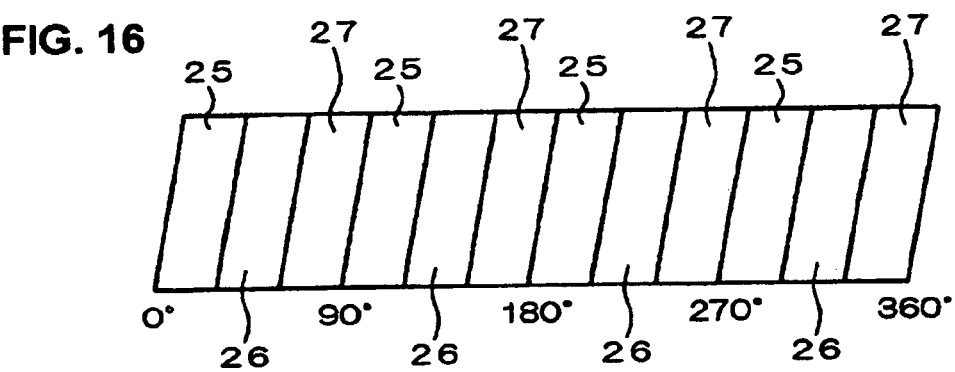
FIG. 16 is a developed circumferential view of the inner periphery of a fourth alternative form of the stator of the brushless motor of FIG. 1, having a modified configuration of stator poles.

FIG. 16 is a developed circumferential view showing another alternative configuration for the pole faces of the stator poles of a brushless motor such as the brushless motor 100, with the poles of the three stator pole groups respectively designated as 22, 23 and 24. In FIG. 16, each of the stator poles is skewed with respect to the direction of the rotor axis by an amount that corresponds to an electrical angle of approximately 60° in relation to the positions of each stator pole in the example of FIG. 15. This effectively reduces the amount of torque ripple. Furthermore since the width of each of the stator poles faces, of each phase, is narrower than an amount corresponding to an electrical angle of 180°, the maximum amount of magnetic flux which passes through each of the stator poles 25, 26, 27 is not reduced, so that the average value of torque is not reduced as a result of the skewed configuration of the stator poles.

It should be noted that with the stator pole shapes shown in FIGS. 15 and 16, it is also necessary to configure the stator poles with spaces to accommodate the stator windings 15, 16, 17 of the respective phases, and also to provide an air gap between the stator poles and the rotor. There is therefore the problem that providing such spaces will result in the external size of such a brushless motor being increased, by comparison with the simple configuration shown in FIG. 3.

Figure 17:
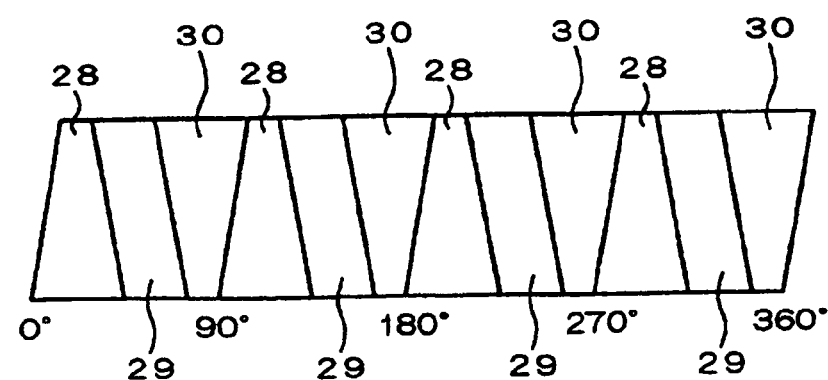
FIG. 17 is a developed circumferential view of the inner periphery of a fifth alternative form of the stator of the brushless motor of FIG. 1, having a modified configuration of stator poles.

FIG. 17 is a developed circumferential view showing another alternative configuration for the stator poles of a brushless motor according to the present invention, with the poles of the three stator pole groups respectively designated as 28, 29 and 30. The shapes of the pole faces of the stator poles of this brushless motor are designed to enable the above problem to be reduced, i.e., to enable the external size of the brushless motor to be minimized. Designating Eu (=dφu/dθ) as the U-phase unit voltage (i.e., the rate of angular rotation of the magnetic flux φu of the U-phase stator poles 28), Ev (=dφv/dθ) as the V-phase unit voltage (the rate of angular rotation of the magnetic flux φv of the V-phase stator poles 29), and Ew (=dφw/dθ) as the W-phase unit voltage (the rate of angular rotation of the magnetic flux φw of the W-phase stator poles 30), the stator poles are respectively shaped as shown in FIG. 17 such that the unit voltages of the three phases will be substantially identical in waveform and in amplitude, and such that these unit voltages will respectively differ by an electrical angle of 120°.

With such shapes for the stator poles, the greater part of the air gap area of each of the stator poles 28, 29, 30 is located close to the central part of the tooth portion of the corresponding stator pole, and the magnetic flux of the rotor 10 passes through the pole face of each stator pole then through the central part of the tooth portion of the pole, and through the back yoke portion of the stator 14, so that the magnetic flux can readily pass. As a result, by comparison with the stator pole configurations shown in the examples of FIGS. 16 and 17 respectively, the separation between each of the stator windings 15, 16,17 and 18 and the stator/rotor air gap (i.e., between each stator winding and the outer face of the corresponding stator pole) can be reduced. Hence, the outer dimensions of the brushless motor can be reduced.

Figure 18:
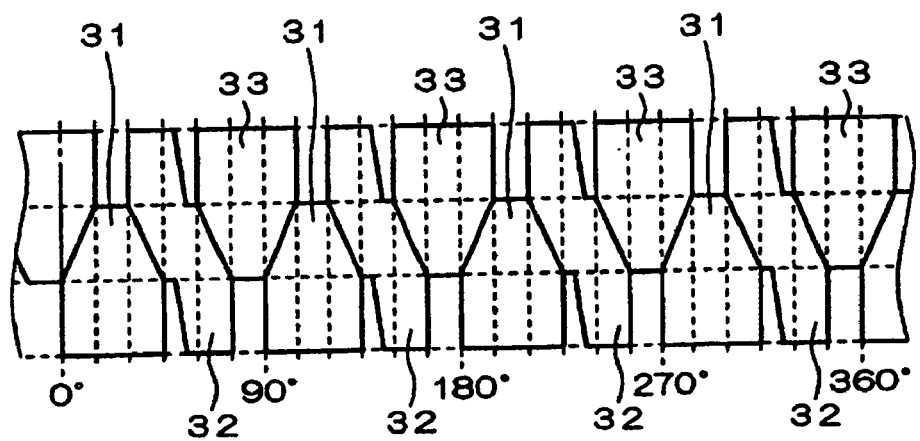
FIG. 18 is a developed circumferential view of the inner periphery of a sixth alternative form of the stator of the brushless motor of FIG. 1, having a modified configuration of stator poles.

FIG. 18 is a developed circumferential view showing another alternative configuration for the stator poles, with the poles of the three stator pole groups respectively designated as 31, 32 and 33. This is an altered form of the stator pole configuration shown in FIG. 17. With the configuration of FIG. 18, the U and W-phase stator poles 31 and 33 each extend to a width, in the circumferential direction, that corresponds to an electrical angle of 180°. By comparison with the basic configuration of FIG. 17, tip portions of the pole faces of each of the U and W-phase stator poles 31 and 33 (i.e., the upper tip portion of the pole face of each stator pole 31, and the lower tip portion of the pole face of each stator pole 32, as seen in FIG. 18) have been removed, since it is difficult to manufacture extremely narrow portions of poles. Each V-phase stator pole 32 is correspondingly shaped as shown, such as to achieve balance with respect to the shapes of the U and W stator poles 31, 33 located on either side.

With such a configuration for the stator poles, the unit voltages Eu, Ev, Ew of the respective phases (i.e., for each phase, the rate of angular rotation of magnetic flux at the surfaces of the poles of that phase) become substantially identical, but differing in phase, and a high level of effective magnetic flux can be passed. In addition, manufacture of a stator having such a configuration of stator poles is comparatively simple.

Figure 19:
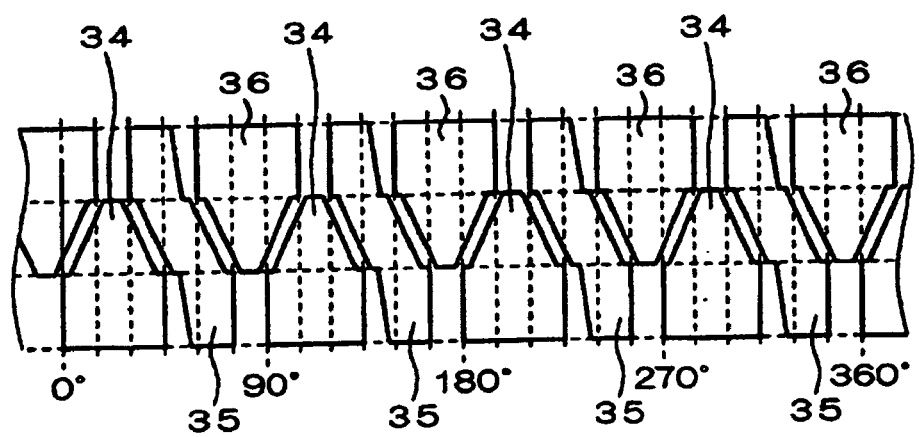
FIG. 19 is a developed circumferential view of the inner periphery of a seventh alternative form of the stator of the brushless motor of FIG. 1, having a modified configuration of stator poles based on that of FIG. 18.

FIG. 19 is a developed circumferential view showing another alternative configuration for the stator poles, with the poles of the three stator pole groups respectively designated as 34, 35, 36. With the examples of stator pole configurations shown in FIGS. 15 to 18, only the basic arrangements of the poles are shown, for describing the principles of each example, and the effects of leakage flux that flows between adjacent stator poles have been ignored. However in actual practice, such leakage flux results in a lowering of output torque, and so should be prevented. To overcome this problem, as shown in FIG. 19 which is a modification of the stator pole configuration shown in FIG. 18, spaces are provided between the pole faces of adjacent stator poles. In that way, the amount of leakage flux that flows between the stator poles can be reduced, and the output torque of the motor correspondingly increased. Furthermore, with such a skewed configuration of the stator poles, torque ripple is reduced.

Figure 20:
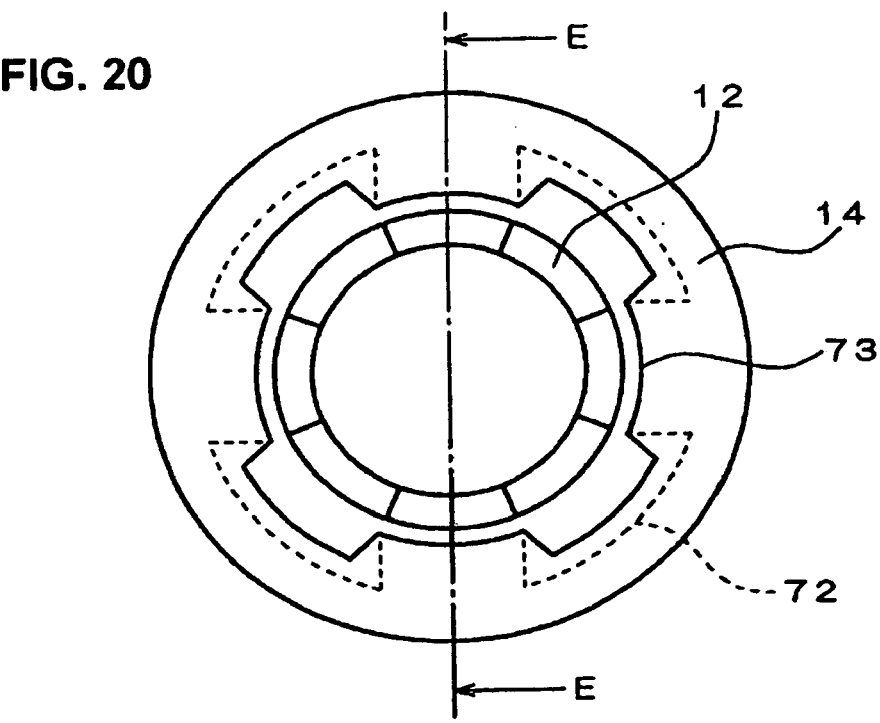
FIG. 20 is a plan view taken along the rotor axis direction, showing an alternative shape for the stator poles of the brushless motor of FIG. 1.
Figure 21:
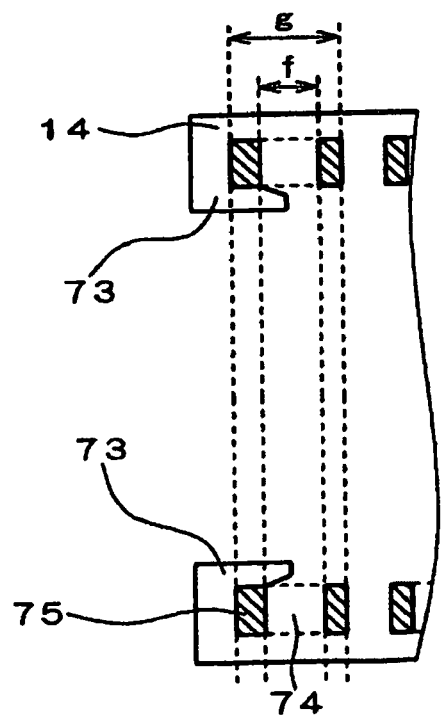
FIG. 21 is a partial cross-sectional view taken in a plane through the line E—E in FIG. 20.

FIGS. 20 and 21 show another alternative configuration of the stator, which assumes that a stator pole configuration and stator winding configuration such as those of FIGS. 3, 4 are utilized, with FIG. 20 being a view taken along the rotor axis direction, and FIG. 21 being a partial cross-sectional view taken in a plane passing through the line E—E in FIG. 20. To simplify the drawings, only the portions of one stator pole that are associated with one stator winding are shown in FIG. 21. In FIG. 20, a basic shape (i.e., a conventional shape) for the stator poles is indicated by the broken-line outline 72. With this alternative configuration, each stator pole 73 is shaped such as to gradually increase in width from its pole face towards its base portion (i.e., portion which is closest to the stator core). This serves to lower the magnetic flux density within the stator pole.

In addition, as a result of the widening of the base portion of each stator pole, as illustrated in FIG. 21, it becomes possible to widen the region of a stator pole within which a stator winding is disposed. Specifically, in FIG. 21, numeral 74 indicates a cross-sectional region corresponding to a stator winding in the case of the aforementioned basic configuration 72 being utilized for each stator pole, while the cross-hatched region 75 corresponds to a stator winding in the case of the alternative configuration 73 being utilized. As shown, use of the alternative configuration enables the cross-sectional width of each stator winding (along the rotor axis direction) to be increased from an amount indicated as "f" to an amount indicated as "g". As a result, since increased cross-sectional area is available for each of the stator windings, it becomes possible to supply a higher level of current to drive the motor, so that increased output torque can be achieved.

In addition, the magnetic flux that passes from the permanent magnets 12 of the stator 14 through a stator pole, then passes through the back yoke region of the stator, and then passes through stator poles of other phases, along the direction of the rotor shaft 11, to return to the permanent magnets 12. Hence, the magnetic flux is passed in an effective manner, so that the output torque of the brushless motor can be increased, or the motor can be made smaller in size.

Specific examples of a configuration for the rotor 10 will be described in the following, referring to FIGS. 22 to 27. Each of these is a cross-sectional view taken in a plane perpendicular to the axis of the rotor shaft 11. The rotor 10 shown in FIG. 22 has the basic configuration shown in FIGS.

1 and 2 for the brushless motor 100. A total of 8 permanent magnets 12 are mounted around the rotor 10, with each of the magnets having an outer surface formed in the shape of an arc of a circle, each having one (N or S) pole at its outer surface. The permanent magnets 12 are mounted coaxially with respect to the rotor shaft 11 (and fixedly attached with respect to the rotor shaft 11), to thereby constitute the outer periphery of the rotor 10. The permanent magnets are arranged such that those having an N pole at the outer surface successively alternate with those having an S pole at the outer surface, around the circumference of the rotor 10, so that N and S poles alternate around the circumferential direction of the rotor 10.

Figure 23:
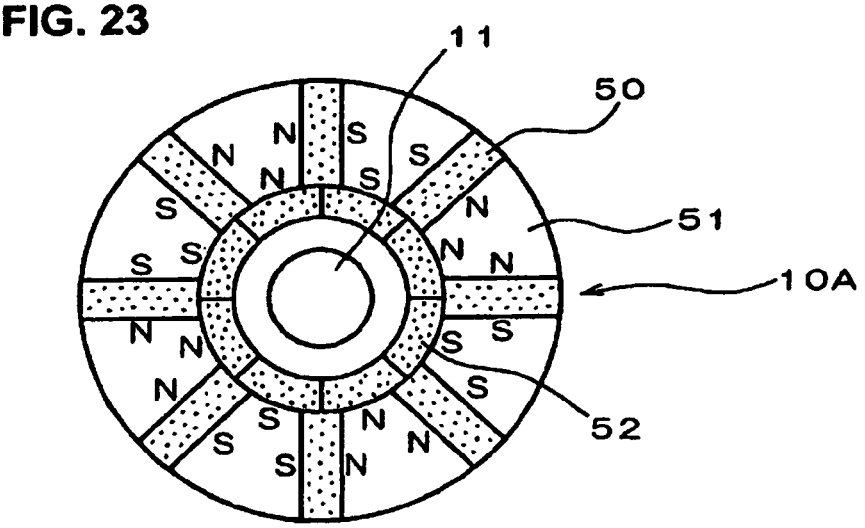
FIG. 23 is a cross-sectional view showing a first alternative arrangement of permanent magnets to constitute the rotor poles of the brushless motor of FIG. 1.

In the example of FIG. 23, a rotor 10A has eight permanent magnets 50 mounted circumferentially, each extending radially, and spaced apart by identical angles. Each of the permanent magnets 50 has a N pole at one side thereof (with respect to the radial direction in which the magnet is oriented) and an S pole at the other side. The permanent magnets 50 are arranged such that those having an N pole at the left side thereof (with respect to the radial direction in which the magnet is oriented) successively alternate with those having an S pole at the left side thereof, so that N and S poles successively occur around the circumference of the rotor 10A in alternation. Pole pieces 51, formed of strongly magnetic material, are disposed between adjacent pairs of the permanent magnets 50, and serve to collect the magnetic flux of the permanent magnets 50 to thereby increase the magnetic flux density at the surface of the rotor 10A. In addition, magnetic flux can flow through the interior of the rotor 10A, through each of the pole shoes 51, so that even if the stator poles are unevenly distributed (i.e., at the air gap surface of the stator), as in the examples of FIGS. 3 or 18, the magnetic flux of the permanent magnets 50 will be efficiently transferred to the stator poles from the rotor 10A, so that increased output torque can be obtained for the motor.

The rotor 10A is also provided internally with eight pole shoes 52, successively arranged circumferentially below the permanent magnets 50. These pole shoes 52, and also the rotor shaft 11, are formed of a non-magnetic material. The lower end of each of the permanent magnets 50 is located close to the interface between two adjacent ones of the pole shoes 52, and this serves to substantially reduce the amount of flux leakage between mutually adjacent ones of the permanent magnets 50 of the rotor.

Alternatively, it is possible to use eight permanent magnets in place of the non-magnetic pole shoes 52. In that case, these permanent magnets would have polarities (at their outer faces) as shown in FIG. 23. If this is done, then a substantially higher level of magnetic flux density can be achieved at the outer surface of the rotor 10A.

Figure 24:
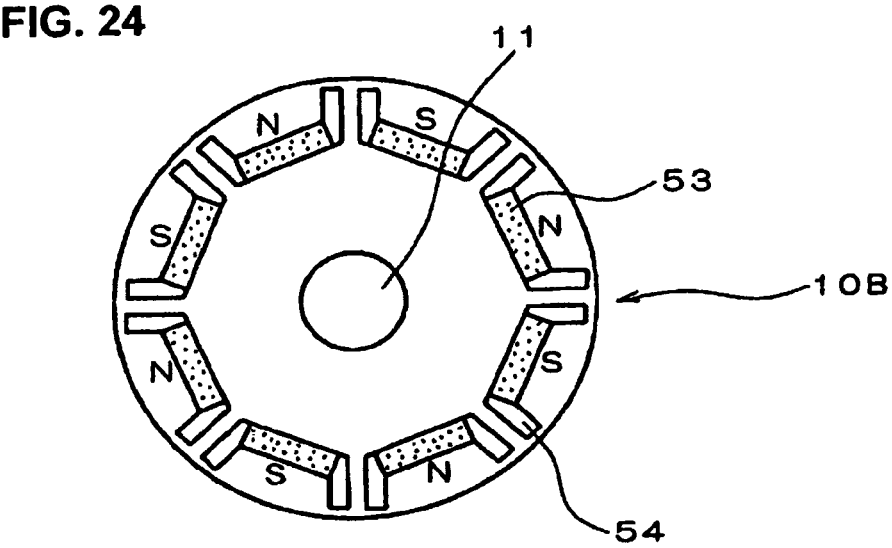
FIG. 24 is a cross-sectional view showing a second alternative arrangement of permanent magnets to constitute the rotor poles of the brushless motor of FIG. 1.

With the configuration of a rotor 10B shown in FIG. 24, eight permanent magnets 53 are arranged circumferentially within the interior of the rotor (i.e., coaxial with the axis of the rotor shaft 11), in what is referred to as the IPMSM configuration. A cavity 54 is formed extending radially towards the outer periphery of the rotor 10B from each end of each of the permanent magnets 53. It should be noted that it would be possible to fill these cavities with a non-magnetic material.

With this configuration of the rotor 10B, both torque resulting from the permanent magnets 53 and also reluctance torque that is produced by portions of the rotor 10B which are not permanent magnets but are formed of a soft magnetic material, are obtained. Furthermore, by controlling the phase of the current flowing in the stator 14, with respect to the angular position of the rotor, the magnitude of the field flux can be controlled, i.e., so-called weak field control can be applied, such that the field flux is reduced as the speed of rotation of the motor becomes high. A constant-power operating characteristic can thereby be obtained.

Alternatively, if the spaces 54 have respective permanent magnets inserted therein, instead of a magnetic material, then a higher magnetic flux density can be produced at the rotor surface, so that a higher level of output torque can be achieved.

Figure 25:
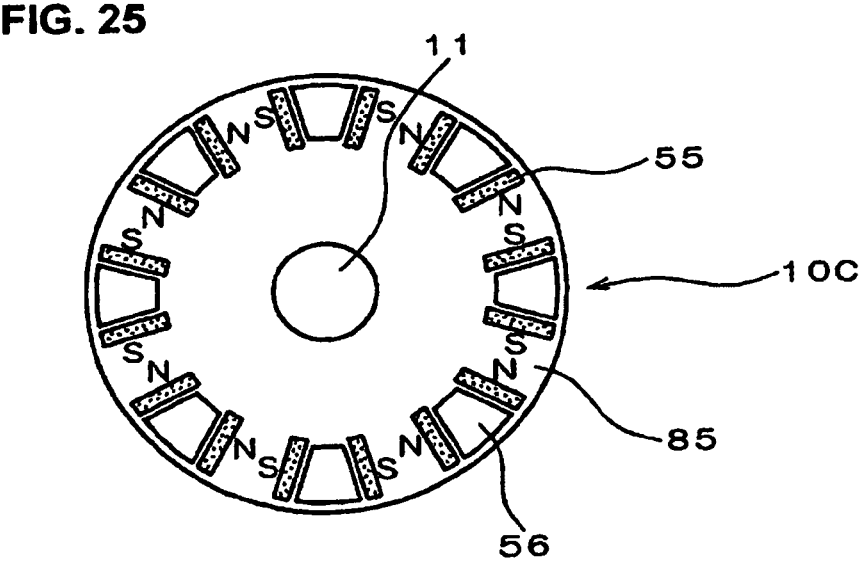
FIG. 25 is a cross-sectional view showing a third alternative arrangement of permanent magnets to constitute the rotor poles of the brushless motor of FIG. 1.

With the rotor 10C having the configuration shown in FIG. 25, eight pairs of permanent magnets 55 are arrayed circumferentially, near the outer periphery of the rotor, with each permanent magnet extending radially with respect to the axis of the rotor shaft 11, and with respective rotor magnets 85 being thereby formed by each of the pairs of permanent magnets 55, at the surface of the rotor 10C. The body of the rotor 10C is formed of a magnetic material. As shown, the adjacent permanent magnets within each pair are oriented with identical directions of polarity (i.e., with the permanent magnets of a pair having N polarity at the left-hand side and S polarity at the right-hand side of each permanent magnet of the pair, or having S polarity at the left-hand side and N polarity at the right-hand side of each permanent magnet of the pair, as viewed from the axis of the rotor shaft 11) and with adjacent ones of the pairs of permanent magnets 55 having mutually opposite directions of polarity. In addition, a cavity 56 is formed between each of the pairs of permanent magnets 55.

As an alternative, it would be equally possible to fill each of the cavities 56 with a non-magnetic material.

With the rotor 10C, when a field flux is produced by the stator windings, torque is generated as a result of the interaction between the rotor magnets 85 and the magnetizing force of the field flux. The manner of generating the torque can be expressed in various ways. For example, assuming that the field flux is produced in the rotor magnets 85 due to a d-axis current component, and that torque is generated as a result of a q-axis current component, it can be considered that no field flux is oriented in the q-axis direction. As a result, the field flux in the rotor magnets 85 is not readily affected by the q-axis current, so that the degree of control of the magnitude of the rotor flux that can be achieved by control of the d-axis current is enhanced. In particular, this is effective for achieving constant-power control, whereby the excitation voltage of the stator windings is reduced, thereby reducing the magnitude of the field flux, when the speed of rotation of the motor becomes high.

Figure 26:
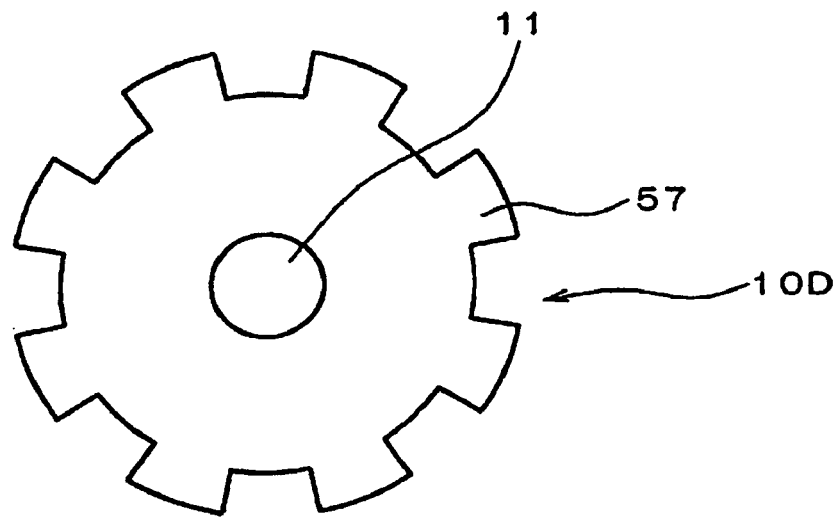
FIG. 26 is a cross-sectional view showing a configuration of stator poles for operating the brushless motor of FIG. 1 as a reluctance motor.

With the rotor 10D having the configuration shown in FIG. 26, eight protruding portions are formed at equidistant positions around the periphery of the rotor, which is formed of a magnetic material, i.e., a protruding-pole rotor configuration is utilized, to implement a reluctance type of brushless motor. This example will be described assuming that the stator windings are of 3-phase Y-connection type. However other types of stator winding configuration may be utilized, to obtain different operating characteristics for the motor. With this example, the current flows through the U, V and W stator windings can be respectively separately controlled, to thereby enable torque to be produced more effectively. With a prior art type of switched reluctance motor, the attraction force in the radial direction can vary such as to shift substantially towards the circumferential direction, and this can cause vibration and noise. However with a brushless motor using a rotor having the configuration of the rotor 10D of FIG. 26, attractive force (towards the stator) is applied to the entire periphery of the rotor, along the radial direction, so that (with the stator having an annular shape) the load constituted by the radially directed attractive force is distributed evenly around the periphery of the rotor. Hence, vibration and noise can be minimized in addition, the rotor can withstand extremely high speeds of rotation. Furthermore, no significant level of cogging torque ripple is produced.

Use of a rotor having the form shown in FIG. 10D also enables the rotor of a brushless motor to have a very simple construction, since it is only necessary to form a body of magnetic material into a predetermined shape.

Furthermore, by appropriately shaping the rotor poles and stator poles, the size of the brushless motor can be made compact. In addition, the manufacture cost can be low, since it is unnecessary to incorporate permanent magnets, which are expensive to provide and assemble.

Figure 27:
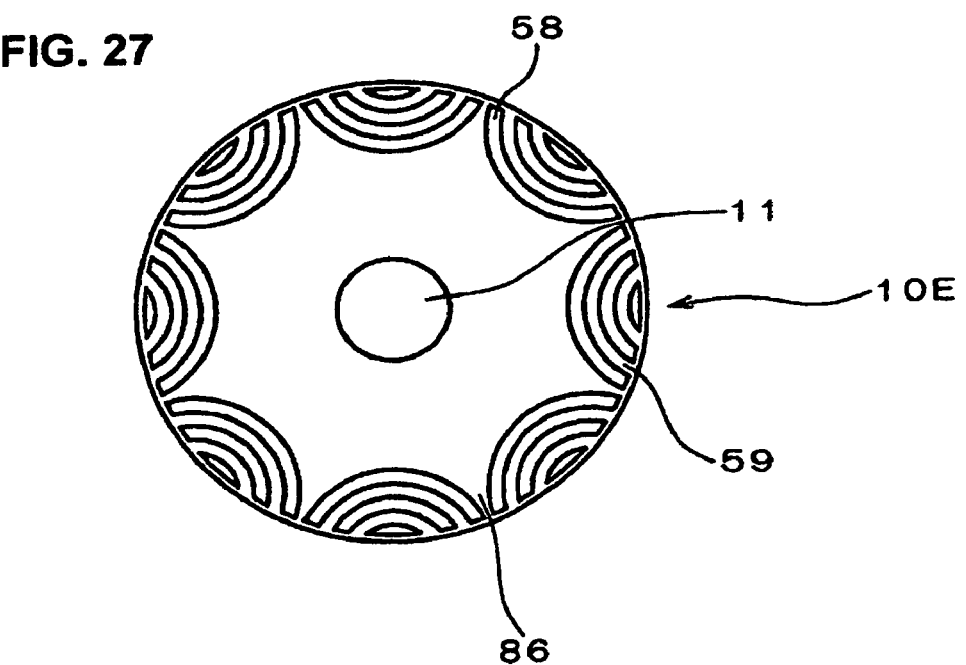
FIG. 27 is a cross-sectional view showing an alternative configuration of stator poles for operating the brushless motor of FIG. 1 as a reluctance motor.

With the rotor 10E shown in FIG. 27, which is also used to implement a reluctance type of brushless motor, a configuration referred to as a flux barrier is utilized. Specifically, the rotor 10E has a body formed of a magnetic material, and incorporates respective magnetic flux barriers 58, each of which may be formed as a cavity within the body of the rotor, or may be filled with a non-magnetic material. The positions of the magnetic flux barriers 58 define eight rotor poles 86, located at equidistant spacings around the circumference of the rotor 10E, i.e., with each rotor pole 86 being disposed between two adjacent ones of the flux barriers 58. In this example, the flux barriers 58 are arranged as eight sets of three, with the flux barriers in each set extending successively from a position close to the surface of the rotor 10E, and each flux barrier being shaped substantially in an arc of a circle (as viewed along the axis of the rotor 10), with the flux barriers within each of the sets of three being substantially concentric. Within each set, each pair of adjacent flux barriers 58 are spaced apart by a narrow region which defines a magnetic flux path 59.

Such a rotor 10E can provide excellent characteristics, similar to those obtainable with the rotor 10D described above.

Figure 28:
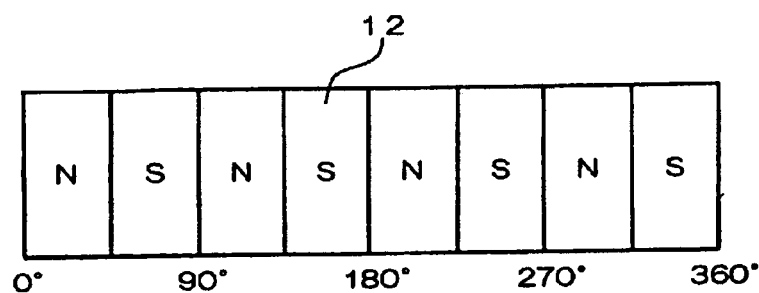
FIGS. 28 and 29 are a developed circumferential view of the outer periphery of the rotor, and a view at right angles to that of FIG. 28, for describing an alternative configuration of permanent magnets constituting rotor poles, to reduce torque ripple of the brushless motor of FIG. 1.
Figure 29:
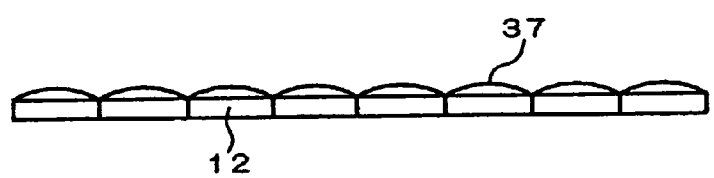

FIG. 28 is a developed circumferential view of the outer circumference of the rotor 10, but with the shape of each permanent magnets 12 (as seen at right angles to the view of FIG. 28) being as shown in the cross-sectional view of FIG. 29. FIG. 28 shows the entire outer periphery of the rotor, i.e., corresponding to a mechanical angle of 360°. As shown, N poles and S poles of the permanent magnets 12 occur at alternating positions along the surface of the rotor 10. Respective pole shoes 37, formed of a strongly magnetic material, are disposed on each of the outer faces of the permanent magnets 12. The pole shoes 37 facilitate the transfer of magnetic flux, so that even if the air gap faces of the stator poles are unequally distributed (as in the examples of FIG. 3 or FIG. 18), the magnetic flux from the rotor 10 can be efficiently transferred to the stator poles, so that an increased level of output torque can be achieved for the motor.

Although not shown in the drawings, a certain amount of space should be provided separating adjacent pairs of the pole shoes 37, in order to reduce the amount of leakage flux between the pole shoes 37. If the outer face of each of the pole shoes 37 is formed with an arc-shaped convex contour (as seen in FIG. 29, i.e., along the direction of the axis of the rotor shaft 11) the magnetic flux distribution at the outer faces of the permanent magnets 12 (more specifically, at the outer faces of the pole shoes 37) will vary, from pole to pole, in a substantially sinusoidal manner. Hence, the amount of torque ripple can thereby be reduced, and vibration and noise in the operation of the brushless motor can also be reduced.

Methods of reducing the torque ripple of the brushless motor 100, by appropriately forming the stator, will be described in the following. With the respective locations of the U-phase stator poles 19 shown in the example of FIG. 3, the poles of a stator pole group are located at respective angular positions such that the distance (angular displacement) between each pair of adjacent poles in the group is equivalent to an electrical angle of 360°. For ease of description in the following, these angular positions for the poles will be referred as their respective reference positions. In order to reduce RN1-th order torque ripple (wherein RN1 is an integer), the stator pole group 19 can be divided into N1 sub-groups, with a relative phase shift of 360°/N1 (i.e., difference of electrical angle from the 360° value) being established between pairs of these sub-groups.

Figure 30:
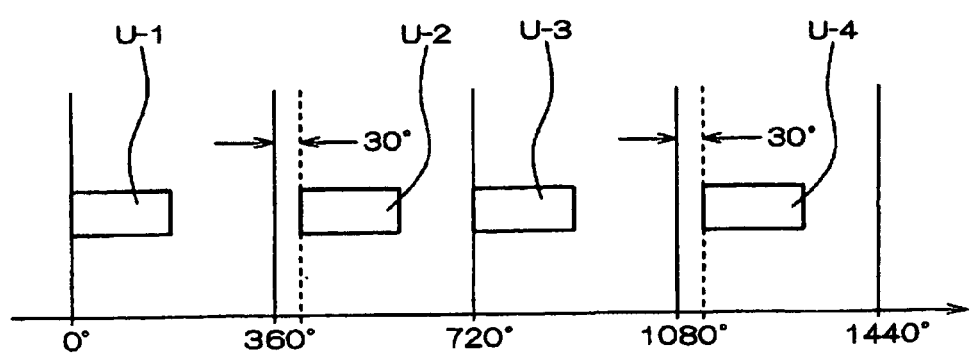
FIG. 30 is a conceptual diagram for illustrating a shifted arrangement of stator poles positions, for reducing torque ripple.

This is illustrated in FIG. 30, showing respective circumferential positions of the U-phase stator poles 19, with corresponding values of electrical angle plotted along the horizontal axis, and with the four U-phase stator poles 19 designated as U-1, U-2, U-3 and U-4. In this example, in order to reduce the 6-th order torque ripple harmonic component (i.e., RN1=6) the four U-phase stator poles 19 are divided into two sub-groups, specifically, the pair U=-1 and U-3 and the pair U-2, U-4. In that case N1=2, so that the relative phase shift between the two sub-groups of the U-phase stator poles 19 is 360°/(RN1×N1)=360°/(6×2)=30°. Thus, the circumferential positions of the stator poles U-2, U-3 are shifted from their reference positions (as defined above) by an amount equivalent to an electrical angle of 30°, as illustrated in FIG. 30.

As a result, there will be a phase difference of 180° between the 6-th order components of torque ripple that results from the pair of poles U=-1 and U-3 and results from the pair U-2, U-4, respectively. Hence, these 6-th order torque ripple harmonic components mutually cancel out, in the output torque produced by the brushless motor 100.

The same arrangement can be applied to the V-phase stator poles 20 and the W-phase stator poles 21.

Furthermore, once the above arrangement of the stator poles has been established, it is possible to further adjust the stator pole positions such as to suppress the 5-th order torque ripple harmonic component. As a specific example, the U-phase stator poles 19 can be divided into the sub-group U-1, U-2 and into the sub-group U-3, U-4. In that case, the relative phase shift between the two sub-groups of the U-phase stator poles 19 is 360°/(RN1×N1)=360°/(5×2)=36°. Thus, the circumferential positions of the stator poles U-3, U-4 should be shifted (i.e., from their respective reference positions) by an amount equivalent to an electrical angle of 36°. This could be done by shifting these stator poles either rightward or leftward (as seen in FIG. 30). However since the stator poles U-2, U-4 have already been shifted rightward, a leftward shift of the stator poles U-3, U-4 would be less effective with respect to torque ripple reduction than a rightward shift. For that reason, the positions of the U-phase stator poles 19 should be adjusted as follows:

Pole U-1 remains at its reference position;

pole U-2 is moved from its reference position rightward by 30° (as shown in FIG. 30);

pole U-3 is moved from its reference position rightward by 36°; and, pole U-4 is moved from its reference position leftward by 6° (i.e., 30–36).

In that way both the 5-th order component and 6-th order component of torque ripple can be reduced.

Such a method of torque ripple reduction is readily applicable to a brushless motor having a large number of poles, since the poles can be readily arranged in groups. If a large number of different orders of torque ripple harmonic component are to be reduced, then the effectiveness may be lowered, depending upon the manner in which the poles are allocated to the respective pole groups. Hence it is necessary to ensure that the position shift effects that are obtained by a plurality of different types of shift do not mutually interfere. For example, if the poles are divided into eight groups G1 to G8, and if three different orders of torque ripple harmonic component are to be reduced, then firstly a predetermined amount of angular position shift should be applied to the groups G1 to G8 to reduce the RN1-order harmonic component. It can be considered that the RN1-order harmonic components for the groups G1 and G5 will mutually cancel. Similarly, it can be considered that the RN1-order harmonic components for the groups G2 and G6, for the groups G3 and G7, and for the groups G4 and G8 respectively, will mutually cancel.

Hence, even if the groups G3 and G7, and the groups G4 and G8, are then respectively shifted in a manner such as to reduce the RN2-order harmonic component of torque ripple, the effectiveness of that reduction will not be lowered as a result of precedingly applied shifting. Thus, both the RN1-order and RN2-order harmonic components of torque ripple can be reduced.

Similarly, if the RN3-order harmonic component of torque ripple is also to be reduced, then the same considerations as those described above can be applied to prevent interference, i.e., the groups G2, G6, G4 and G8 can each be shifted by an appropriate angular amount to achieve cancellation of the RN3-order harmonic component.

In that way, three different types of pole shifts can be performed, with little probability of mutual interference between the effects of these, so that three different types of harmonic component of the torque ripple can be lowered effectively.

In the above description of shift methods, it is assumed that a 180° phase difference is established between harmonic components of torque ripple in order to effect mutual cancellation of these. However it would be equally possible to divide the poles into three sub-groups, which effectively differ in phase by 120° (i.e., whereby each adjacent pair of sub-groups differ in angular position around the circumferential direction of the stator by an amount corresponding to an electrical angle of 120°), or to divide the poles into a number of groups that is greater than three, with effective cancellation of harmonic components of torque ripple being achievable.

Methods of configuring the rotor of the brushless motor 100 to reduce torque ripple will now be described. To reduce the RN1-order harmonic component of torque ripple, the rotor poles (e.g., constituted by the permanent magnets 12 of the rotor 10) can be arranged with each of the set of N and the set of S poles divided into N1 sub-groups, with each of these sub-groups differing in circumferential position with respect to an adjacent sub-group by an amount corresponding to a phase difference that is an integral multiple of 360°/(RN1×N1) i.e., with the difference circumferential position corresponding to an electrical angle of 360°/(RN1×N1).

Basically, the method of torque ripple reduction is similar to that described above for the stator poles, with the RN1-order harmonic component of torque ripple being cancelled within each of the pole groups.

Figure 31:
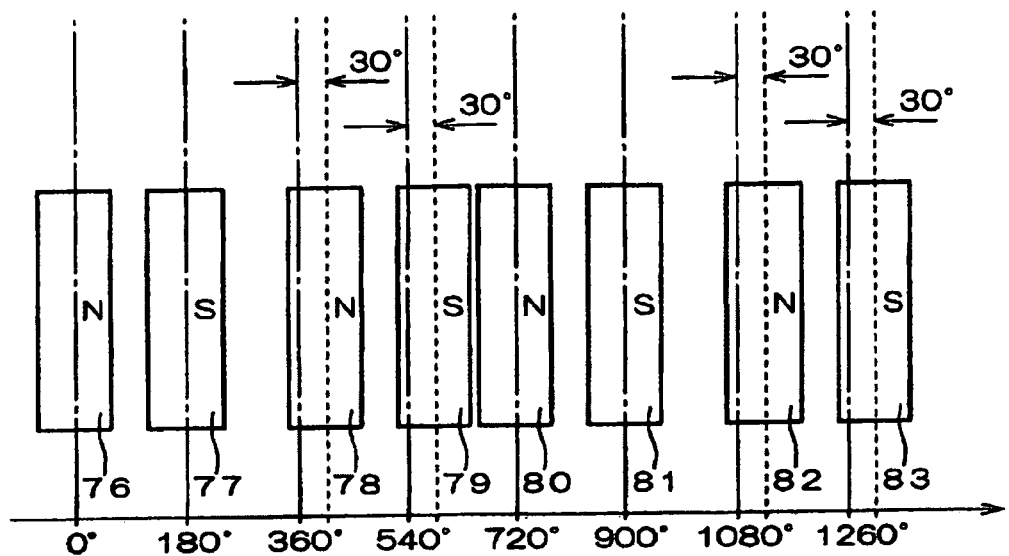
FIG. 31 is a conceptual diagram for illustrating a shifted arrangement of positions of rotor poles constituted by permanent magnets, for reducing torque ripple.

FIG. 31 shows a specific example of an arrangement whereby the rotor pole (permanent magnets) are shifted to effect reduction of torque ripple. In this example there are eight permanent magnets (e.g., corresponding to the permanent magnets 12 shown in FIG. 1), respectively designated by numerals 76 to 83. Of these, the four permanent magnets 76, 78, 80, 82 have their respective N poles at the outer surface, while the pairs of permanent magnets 76, 80 are assigned as a sub-group of the N poles and the permanent magnets 78, 82 are assigned as a second sub-group of the N poles are also grouped. The permanent magnets of one sub-group, 78, 82, are shifted circumferentially (with respect to the poles of the second sub-group 78, 82) by an amount corresponding to an electrical angle of 30°. As shown in FIG. 31, the same arrangement is applied to the four permanent magnets 77, 79, 81 and 83, each of which has its S pole located at the outer surface.

In that way, 6-th order harmonic components of torque ripple can be cancelled.

Figure 22:
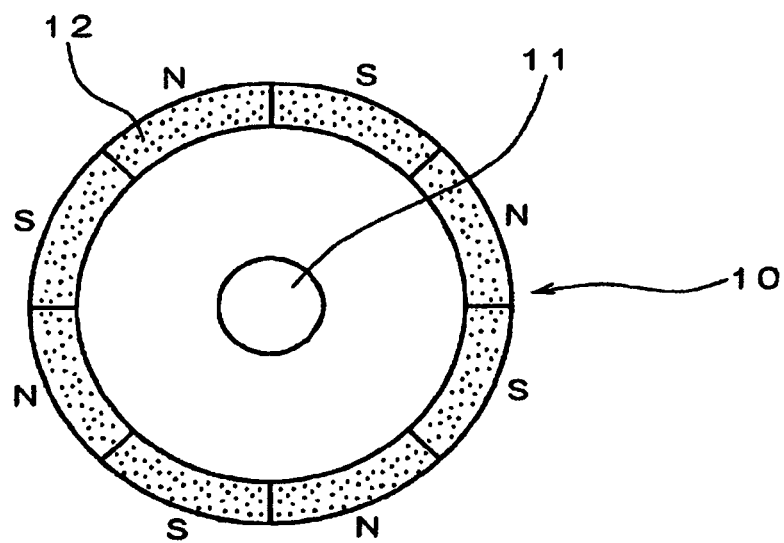
FIG. 22 is a cross-sectional view showing an arrangement of circumferentially mounted permanent magnets to constitute the rotor poles of the brushless motor of FIG. 1.

It should be noted that it would be possible to configure a rotor as shown in FIG. 22, with permanent magnets disposed around the rotor surface, either by mounting an annular permanent magnet (i.e., which has been formed with the arrangement of alternating N and S poles shown) on the rotor, or by magnetizing the rotor with such a pattern of N and S poles at the final stage of manufacture of the rotor.

Methods of reducing the level of magnetic force acting along the rotor shaft 11 will be described in the following. With the brushless motor 100 of FIG. 1 described above, for example with the stator winding arrangement shown in FIG. 3, currents of respectively opposite direction (more specifically, flow in the V-phase stator winding 16 and V-phase stator winding 17. Hence, the resultant magnetizing forces acting along the direction of the rotor shaft 11 are mutually cancelled. However a magnetizing force is produced, acting along the axial direction of rotor shaft 11, that result from currents that flow in the U-phase stator winding 15 and W-phase stator winding 18. In many cases this will not present a problem. However in cases in which it does present a problem, all or part of the rotor shaft 11 can be formed of a non-magnetic material such as stainless steel. Alternatively, an auxiliary winding can be mounted on the stator 14 in the vicinity of the rotor shaft 11, with current passed through that winding such as to produce a magnetizing force along the shaft axis direction that will cancel the total amount of magnetizing force produced by the U-phase winding 15 and the W-phase winding 18.

Figure 32:
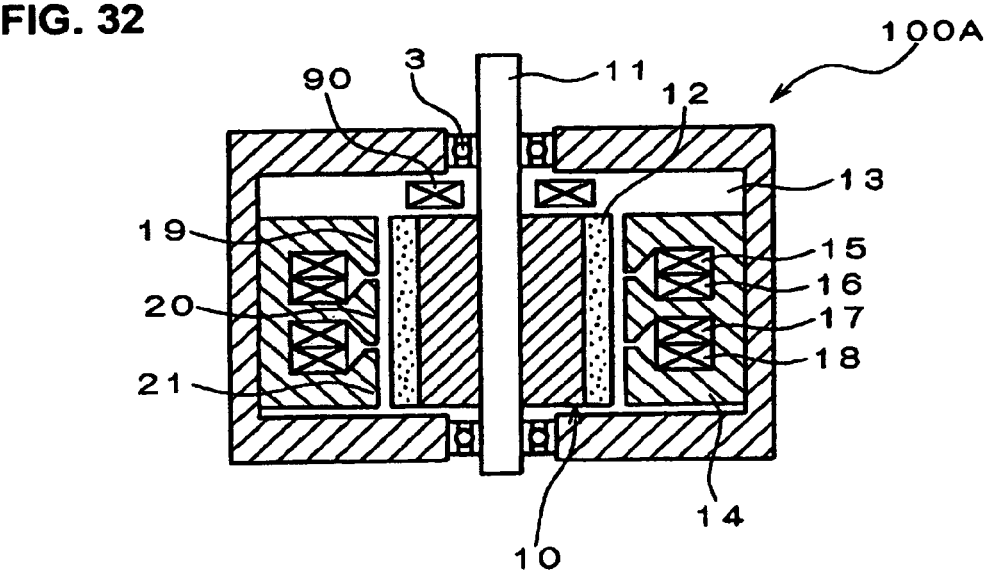
FIG. 32 is a cross-sectional view of an alternative form of the brushless motor of FIG. 1 taken in a plane passing through the rotor axis, provided with an auxiliary winding for use in cancelling a magnetizing force acting along the rotor axis direction.

An example of such an arrangement is shown in FIG. 32, which is a cross-sectional view taken in a plane parallel to the rotor axis, of an alternative example of a brushless motor, designated as 100C, whereby an auxiliary stator winding is added for the specific purpose of cancelling the aforementioned magnetizing force that acts along the direction of the rotor shaft 11 due to the currents that flow through the U-phase winding 15 and W-phase winding 18. The auxiliary winding 90 is disposed around the circumference of the rotor shaft 11, as shown. In other respects, the configuration of the brushless motor 100A is identical to that of the brushless motor 100 of FIG. 1. The auxiliary winding 90 has the same number of turns as each of the U-phase stator winding 15 and W-phase stator winding 18. The diameter of the rotor shaft 11 is smaller than that of the U-phase stator winding 15 or W-phase stator winding 18, so that the weight of the auxiliary winding 90 is comparatively small.

By passing currents through the auxiliary winding 90 that are of appropriate phase, direction and amplitude to produce a magnetic flux along the rotor axis direction that is of the same magnitude but opposite polarity to the net amount of magnetizing force generated (i.e., at each of successive angular positions attained by the rotor) in combination by current flows through the U-phase winding 15 and W-phase winding 18, that net amount of magnetizing force acting along the rotor shaft 11 can be effectively eliminated.

A control apparatus for a brushless motor according to the present invention such as the brushless motor 100 shown in FIG. 1 will now be described. The output torque produced by such a brushless motor is expressed by equation (11) above. Hence, a control apparatus for the brushless motor 100 can operate by determining the respective currents that flow in the phase windings 15 to 18, in accordance with equation (11) such as to produce a requisite value of output torque, e.g., with that value being expressed by a torque command. It will be assumed in the following that this torque control is applied in order to control the brushless motor to run at a specific speed of rotation, which is specified by a speed command value.

FIG. 33 is a circuit diagram of an example of such a control apparatus 200 for the brushless motor 100, with this control apparatus 200 being utilized in conjunction with a encoder 113 that detects the angular position of the rotor shaft 11 of the brushless motor 100. It will be assumed that the brushless motor 100 has four stator windings as in the example of FIG. 4, i.e., a U-phase stator winding 15, a pair of V-phase stator windings 16, 17 and a W-phase stator winding 18.

In the following description of FIGS. 33 and also FIG. 34, for brevity of description, when three quantities (corresponding to the U, V and W-phases respectively) are stated to be assigned to "the phase windings 15 to 18 respectively" it is to be understood that these are assigned to the U-phase stator winding 15, the pair of V-phase stator windings 16, 17 in combination, and the W-phase stator winding 18, respectively.

The control apparatus 200 is made up of a speed control block 102, a current command block 104, a voltage control block 106, a power amplifier block 108 and a detection circuit 114. The detection circuit 114 detects the speed of rotation of the brushless motor 100 based on the values of angular position produced from the encoder 113, and outputs a speed detection signal 101. A speed command signal 300, expressing a required value of speed of rotation for the brushless motor 100, is supplied, and the speed detection signal 101 is subtracted from the speed command signal 300 to obtain a speed error quantity, which is supplied to the speed control block 102. The speed control block 102 operates on the speed error quantity to derive a torque command signal 103, by applying a technique such as proportional integrated control, etc. The current command block 104 generates current command signals 105 for each of the phase windings 15 to 18 based on the torque command signal 103 and various parameters of the brushless motor 100, and on a rotation position signal 116 that is supplied from the detection circuit 114. The voltage control block 106 calculates current control error amounts based on current detection signals 110, 111, 112 for the phase windings 15 to 18 based on the current command signals 105 and a rotation position signal 115 supplied from the detection circuit 114, and thereby produces voltage commands 107 corresponding to the phase windings 15 to 18, designating respective levels of supply voltage that are to be supplied to these phase windings. These voltage commands 107 are supplied to the power amplifier block 108, which derives corresponding PWM (pulse width modulation) signals, which are used to control a 3-phase power inverter circuit (i.e., DC-to-AC power converter) to determine the effective values of supply voltage that are applied to the U-phase stator winding 15, to each of the V-phase stator winding 16 and V-phase stator winding 17, and to the W-phase stator winding 18, respectively.

Since such types of 3-phase power inverter (e.g., utilizing power transistors connected in a bridge configuration) are well known, detailed description is omitted.

The respective values of phase current that flow in the U-phase stator winding 15, in each of the V-phase stator windings 16, 17, and in the W-phase stator winding 18, designated as Iu, Iv and Iw, are thereby determined by the supply voltages of the respective phases, such as to attain values that will reduce the amount of error between the required torque (expressed by the torque command signal 103) and the actual output torque (total of the respective torque amounts corresponding to the three stator pole groups).

The method of control by the current command block 104 based on equation (11) will be described in the following, designating the respective levels of magnetic flux in the U, V and W stator poles 19, 20, 21 of the stator 14 as $\phi u$, $\phi v$, $\phi w$, the respective rates of rotational displacement of these magnetic fluxes as $Eu=d\phi u/d\theta$, $Ev=d\phi v/d\theta$, $Eq=d\phi w/d\theta$, the respective numbers of turns of the U, V and W-phase stator windings as Wu, Wv, Ww, and the respective levels of current that flow in the U, V and W-phase stator windings as Iu, Iv and Iw.

The phase currents Iu, Iv and Iw are controlled such that the total amount of torque produced, designated as Ta, will correspond to the required torque (expressed by the torque command signal 103), with the following relationship existing between these currents and Ta:

$$Ta = Wu \times Eu \times Iu + Wv \times Ev \times Iv + Ww \times Ew \times Iw$$

The characteristics of the brushless motor 100 shown in FIG. 1 etc., are expressed by the aforementioned equations (1) to (11). Designating the rotational (angular) position of the rotor 10 of the brushless motor 100 as $\theta m$, assuming that the respective values of unit voltage Eu, Ev, Ew for the three phases can be derived based on the characteristics of an ideal brushless motor as expressed by the following equations, and that a coefficient E1 is identical for each of the three phases, then the following equations can be established:

$$Eu = E1 \times \cos(\theta m) \qquad (22)$$

$$Ev = E1 \times \cos(\theta m + 120°) \qquad (23)$$

$$Ew = E1 \times \cos(\theta m + 240°) \qquad (24)$$

Designating the phase difference between currents that controls the direction of rotation of the poles of the rotor 10 as the current phase angle $\theta i$, each of the phase currents Iu, Iv, Iw can be expressed by the following equations:

$$Iu = Ia \times \cos(\theta m + \theta i) \qquad (25)$$

$$Iv = Ia \times \cos(\theta m + 120° + \theta i) \qquad (26)$$

$$Iw = Ia \times \cos(\theta m + 240° + \theta i) \qquad (27)$$

The torque Ta is obtained from equation (11) as follows:

$$Ta = Tu + Tv + Tw \quad (28)$$
$$= Wc + (Eu \times Iu + Ev \times Iv + Ew \times Iw)$$
$$= Wc \times (E1 \times \cos(\theta m) \times Ia \times \cos(\theta m + \theta i) +$$
$$E1 \times \cos(\theta m + 120°) \times Ia \times \cos(\theta m + 120° + \theta i) +$$
$$E1 \times \cos(\theta m + 240°) \times Ia \times \cos(\theta m + 240° + \theta i))$$
$$= Wc \times Ia \times Ei \times (3/2) \times \cos\theta i$$

In the above, Wc is the number of turns of each of the stator windings of the three phases (i.e., with these being assumed to be respectively identical), E1 is a coefficient of the rate of rotational displacement of the magnetic flux that links the respective stator windings. These values are known beforehand, as motor parameters. The current amplitude Ia is obtained from the following equation:

$$Ia = (\tfrac{2}{3}) \times Ta/(Wc \times E1 \times \cos \theta i) \quad (29)$$

If control such as weakening of the motor field is not applied, then normally the current phase angle θi can be assumed to be zero, so that in effect, with the above example, it is only necessary for the current command block 104 to perform the calculation of equation (29) above, as its function.

However, depending upon design considerations for a specific type of brushless motor, it would be possible to use respectively different numbers of turns for the phase windings. In addition, it is not essential that the unit voltages Eu, Ev, Ew be in balanced 3-phase arrangement, and these could respectively differ in phase in some other manner, or have respectively different amplitudes. In that case, the calculation of the equation (11) can be performed respectively separately for each of the three (U, V, W) phases, by inserting the appropriate values into the equation, to obtain corresponding values of current amplitude Ie and phase θi.

As an example of a complex case, if the unit voltages Eu, Ev, Ew of the respective phase windings 15 to 18 are not in a balanced 3-phase relationship, due to the fact that harmonic components are produced, that is to say, if there is a condition whereby torque ripple occurs, then in such a case also, if the exact characteristics for the unit voltages Eu, Ev, Ew of the respective (U, V, W) phases can be obtained, then appropriate values for the current value Ia and the current phase θi can be determined in accordance with the rotation position θm of the rotor 10, by applying equation (11). Control for reducing the torque ripple can thereby be applied.

It should be noted that various alternative forms are possible for each of the circuit blocks. For example, it would be possible for the encoder 113 and the detection circuit 114 to be replaced by a circuit that does not utilize a sensor, but which derives a position detection signal based upon voltages and current values of the brushless motor 100.

Furthermore, the concepts described above could equally well be applied to a polyphase AC motor having four or more phases.

In the case of a brushless motor having a pair of loop-configuration stator windings, each located between a corresponding pair of stator pole groups as for the windings 38 and 39 in FIG. 13 described above, 2-phase operation is applied. Designating the two phases as the M and N phases, it would be possible to directly apply 2-phase drive voltages to the respective stator windings, with these connected as illustrated in the conceptual circuit diagram of FIG. 44, in which currents Im and In of identical direction flow in the M and N-phase stator windings. However since 3-phase power inverters (i.e., DC-to-AC power converters) are more efficient than 2-phase power inverters, it is preferable to adapt 3-phase balanced AC drive to the 2-phase motor. The basic concept of this is illustrated in the circuit diagram of FIG. 45. As shown, although a 3-phase power supply is utilized, so that U-phase, V-phase and W-phase currents flow from the power source (i.e., controlled 3-phase power inverter), a current of (−Iw+Iu) is supplied to one terminal of each of the 2-phase stator windings of the 2-phase brushless motor, while a current of (−Iu+Iv) is supplied to the second terminal of one of the two stator windings, while a current of (−Iv+Iw) is supplied to the second terminal of the other one of the two stator windings. As a result, the same operation is achieved as that shown in FIG. 44, with two-phase currents Im and In being respectively supplied to the M and N-phase stator windings.

Figure 45:
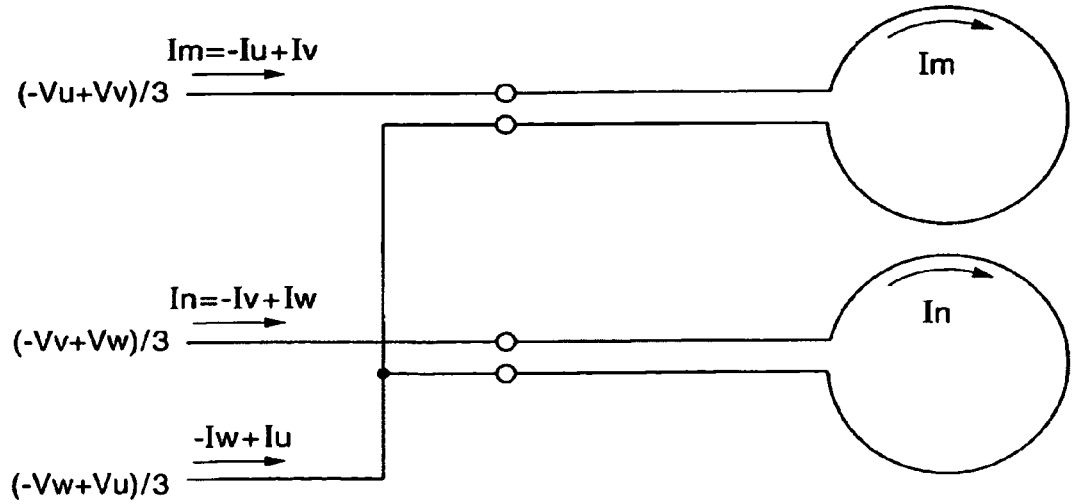
Figure 46:
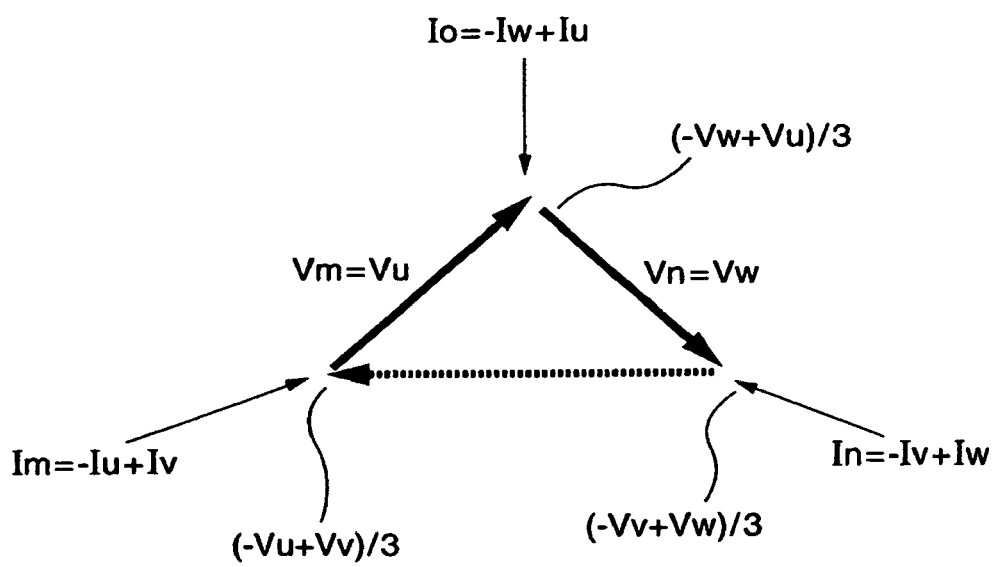
FIG. 46 is a vector diagram illustrating the relationships between the 3-phase AC voltages and currents and resultant 2-phase AC voltages and currents that are supplied to the 2-phase motor.

As illustrated in FIG. 45 and in the corresponding voltage and current vector diagram of FIG. 46, this is done by supplying a combination of phase voltages (−Vw+Vu)/3 in common to to one terminal of each of the 2-phase stator windings, and supplying a combination of phase voltages (−Vw+Vu)/3 to the second terminal of one of the two stator windings, while a combination of phase voltages (−Vv+Vw)/3 is supplied to the second terminal of the other one of the two stator windings, where Vu, Vv and Vw are the 3-phase voltages generated by the 3-phase power inverter.

Figure 44:
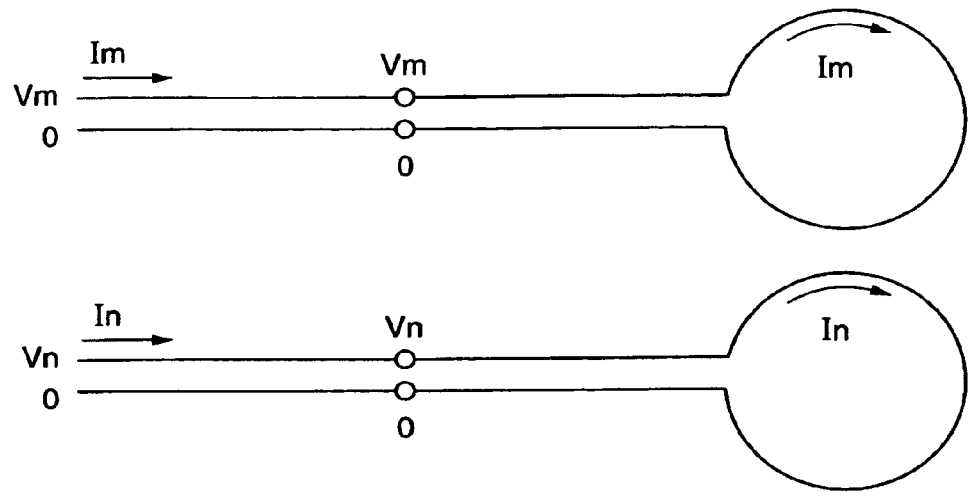
FIGS. 44, 45 are conceptual circuit diagrams for use in describing a method of driving a 2-phase brushless motor according to the present invention by utilizing 3-phase AC voltages.

With such an arrangement, as seen from the side of the 2-phase brushless motor, it is being driven by 2-phase currents differing in phase by 120°, in the same manner as shown in FIG. 44. However as seen from the side of the 3-phase power inverter, it is supplying 3-phase currents to a 3-phase delta balanced load.

It should be noted that it would also be possible to utilize other methods for driving the 2-phase brushless motor from a 3-phase power source, such as dividing the M-phase and N-phase stator windings into sections, etc.

A control apparatus for driving a 2-phase brushless motor having windings as shown in FIG. 13, using a 3-phase power inverter to derive AC supply voltages, will be described in the following, referring to FIG. 34. In FIG. 34, a control apparatus 200A controls a 2-phase brushless motor 100B, e.g., having M and N-phase stator windings such as the M-phase winding 38 and N-phase winding 39 of the 2-phase brushless motor of FIG. 13, having the groups of U, V and W stator poles 19 to 21. The configuration and operation of the control apparatus 200A are essentially similar to those of the control apparatus 200 described above, but differ in that M and N-phase stator windings 38, 39 are controlled by a power amplifier block 208. A voltage control block 206 calculates current control error amounts based on current detection signals 117, 118 for the M and N-phase windings 38, 39, current command signals 205 supplied from the current command block 204, and the rotation position signal 115 supplied from the detection circuit 114, to thereby produces voltage commands 207 corresponding to the phase windings 38, 39, specifying respective levels of supply voltage that are to be applied to these phase windings.

These voltage commands 207 are supplied to the power amplifier block 208, which derives corresponding PWM (pulse width modulation) signals, which are used to control a 2-phase power inverter circuit to determine the effective values of supply voltage that are respectively applied to the M-phase winding 38 and the N-phase winding 39.

Designating the respective levels of magnetic flux of the U, V and W-phase stator poles of the stator 14 as $\phi u$, $\phi v$, $\phi w$ respectively, and the respective unit voltages for the U, V and W-phases (i.e., respective rates of rotational displacement of magnetic flux) as $Eu = d\Phi u/d\theta$, $Ev = d\phi v/d\theta$, $Ew = d\phi w/d\theta$, and also designating the number of turns of the M-phase winding 38 as Wm and that of the N-phase winding 39 as Wn, the control apparatus 200A controls the M-phase current In of the M-phase winding 38 and the N-phase current of the N-phase winding 39 to produce an output torque Tb that corresponds to the value expressed by the torque command signal 103, where:

$$Tb = Wm \times Eu \times Im + Wn \times Ew \times In$$

As a simple example, with the values for Eu, Ev and Ew of the U, V and W stator poles 19 to 21 being derived from the aforementioned equations (22), (23) and (24), and assuming that each of the M-phase winding 38 and N-phase winding 39 have the same number of turns, designated as Wc, the respective 2-phase current values in the stator windings can be obtained as follows, by simply converting the 2-phase current values from the values that are derived for the 3-phase current values of a 3-phase balanced stator winding configuration, using equations (14) and (15) above. In that case, from equation (19):

$$\begin{aligned}Tb &= Tm + Tn \\ &= Wc \times (-Eu \times Im) + Ew \times In) \\ &= Wc \times (-E1 \times \cos(\theta m) \times 1.732 \times Ia \times \cos(\theta m + 150°) + \\ &\quad E1 \times \cos(\theta m + 240°) \times 1.732 \times Ia \times \cos(\theta m + 270°) \\ &= Wc \times Ia \times E1 \times (3/2)\end{aligned} \quad (30)$$

Hence:

$$Ia = (\tfrac{2}{3}) \times Tb/(Wc \times E1) \quad (31)$$

$$Im = 1.732 \times Ia \times \cos(\theta m + 150°)$$

$$In = 1.732 \times Ia \times \cos(\theta m + 270°)$$

Equation (31) provides a value for the case in which the current phase angle $\theta i$ equals zero in equation (28). With this example, it can be understood that the only function required to be performed by the current command block 204 is simply to calculate in accordance with equation (31).

However the only essential condition is that equation (19) must be satisfied, and hence, combinations of values for the M-phase current Im and the N-phase current In can be freely determined. In addition, it is not essential that the unit voltages Eu, Ev, Ew be in a balanced 3-phase arrangement, and these could respectively differ in phase in some other manner, or have respectively different amplitudes. In that case, the calculation of the equation (19) can be performed by inserting the actual values of unit voltage into the equation, so that the calculations of equations (30), (31) can then be performed, and the values of the phase currents Im and In, and phase $\theta i$, can thereby be derived.

For example, if the unit voltages Eu, Ev, Ew of the respective phase windings 15 to 18 are not in a balanced 3-phase relationship due to the fact that harmonic components are produced, i.e., if there is a condition whereby torque ripple occurs, then in such a case also, if accurate values for the unit voltages Eu, Ev, Ew of the respective (U, V, W) phases can be obtained, then appropriate values for the currents Im, Im and the current phase $\theta i$ can be determined in accordance with the rotation position $\theta m$ of the rotor, by applying equation (11). Control for reducing the torque ripple can thereby be applied.

It should be noted that the present invention is not limited to the embodiments and alternative configurations described above, and that various other forms of the invention could be envisaged, which fall within the scope claimed for the invention. In particular, the above embodiments have been described for the case of a brushless motor having 3-phase or 2-phase stator windings, however the invention is equally applicable to an N1-phase polyphase brushless motor, where N1 is an integer of 4 or more. As described hereinabove for example with the 3-phase brushless motor shown in FIG. 11, each of the stator windings of the respective phases can be replaced by a pair of loop-configuration stator windings, and this is also true for any N1-phase brushless motor. Hence it becomes possible to eliminate those portions of the stator windings that are located between adjacent stator poles.

Furthermore, within the outermost (i.e., first and N1-th) ones of the pairs of loop-configuration stator windings, it is possible to eliminate the windings that are located at the end faces of the stator core, i.e., are located on the axially outward sides of the outermost poles. In that way, the amount of copper required to form the stator windings can be reduced, by comparison with a prior art type of brushless motor, even when the number of phases is made 4 or higher, and the brushless motor can utilized simple loop-configuration windings as the stator windings.

Figure 35:
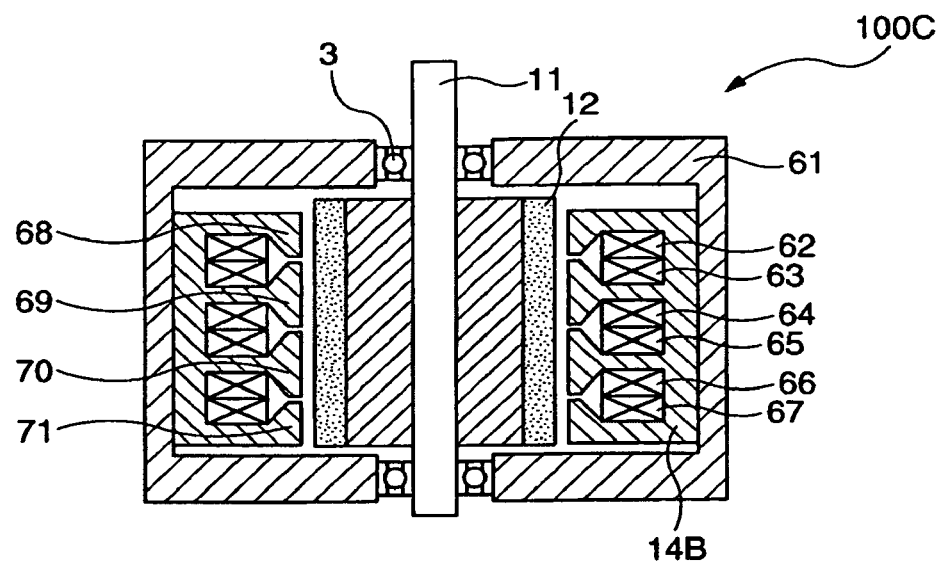
FIG. 35 is a cross-sectional view of another alternative form of the brushless motor of FIG. 1 taken in a plane passing through the rotor axis, which is a 4-phase brushless motor.
Figure 36:
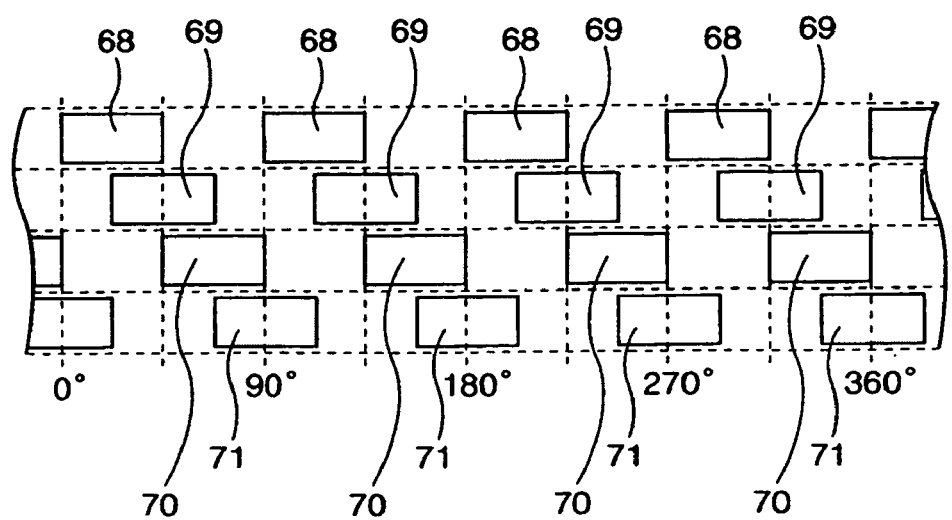
FIG. 36 is a developed circumferential view of the inner periphery of the stator of the 4-phase brushless motor of FIG. 35.
Figure 37:
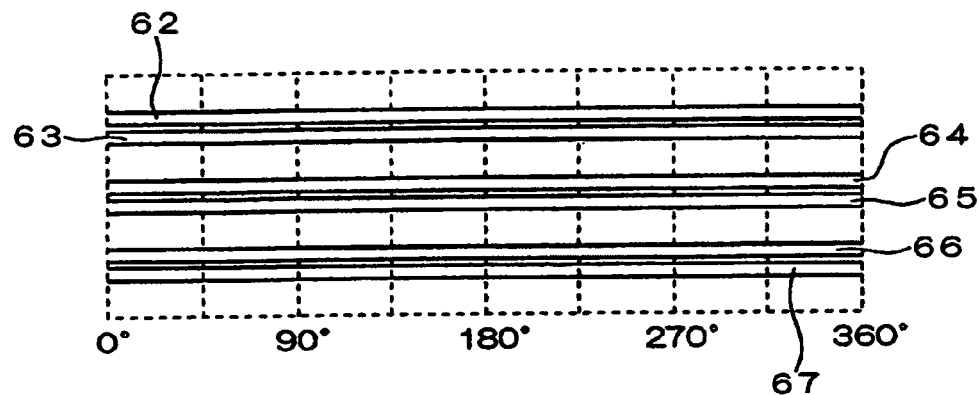
FIG. 37 is a developed circumferential view showing stator windings of the 4-phase brushless motor of FIG. 35.

FIGS. 35, 36 and 37 are diagrams of an embodiment of a 4-phase brushless motor 100C, with these diagrams respectively corresponding to the FIGS. 1, 3 and 4 for the 3-phase brushless motor 100 described above. The stator 14B of the brushless motor 100C is provided with four stator pole groups, i.e., a group of U-phase stator poles 68, a group of V-phase stator poles 69, a group of W-phase stator poles 70, a group of X-phase stator poles 71, and has six loop-configuration stator windings, i.e., a U-phase winding 62, a pair of V-phase windings 63, 64, a pair of W-phase windings 65, 66, and an X-phase winding 67. The stator windings are connected to receive supply voltages of the respective phases such that a negative direction of current (as defined hereinabove in the description of the operation of the brushless motor 100) (–Iu) flows in the U-phase winding 62, a positive current Iv flows in the V-phase winding 63, a negative current (–Iv) flows in the V-phase winding 64, a positive current Iw in the W-phase winding 65, a negative current (–Iw) flows in the W-phase winding 66, and a positive current Ix flows in the X-phase winding 67.

In the same way as for the brushless motor 100 of FIG. 1, two loop-configuration windings (i.e., a U-phase winding and an X phase winding) which could be provided at the end faces of the stator are omitted (for the reasons described hereinabove with respect to FIG. 11 and the stator winding configuration shown in FIG. 4).

Hence, the U-phase stator poles 68 and the X-phase stator poles 71 (i.e., the two sets of stator poles that are respectively located adjacent to the outer ends of the stator 14B, with respect to the rotor axis direction) each have a corresponding single loop-configuration stator winding disposed immediately adjacent thereto, while all other sets of stator poles each have a corresponding pair of loop-configuration stator windings disposed immediately adjacent on either side thereof.

It should be noted that, for the same reasons as described hereinabove for the brushless motor 100, with respect to the alternative stator winding configuration shown in FIG. 14, it would be possible to replace each of the pairs of mutually adjacent stator windings (i.e., the stator winding pair 62, 63, the stator winding pair 64, 65, the stator winding pair 66, 67) with respective single loop-configuration windings. That is to say, the two currents (of respectively opposite direction, as described hereinabove with respect to the stator winding configuration of FIG. 3 for the brushless motor 100) that respectively flow in a pair of stator windings (e.g., the stator windings 62, 63) located between two stator poles of different polarity are mutually added, so that at single loop-configuration winding can provide an equivalent electrical effect to that of such a pair of adjacent loop-configuration windings. By replacing each pair of mutually adjacent loop-configuration windings in that way, the construction of the stator 14B can be simplified, and the amount of copper required to form the stator windings can be reduced.

With the first embodiment described above, having the stator pole configuration shown in FIGS. 1 and 3, i.e., with three stator pole groups, the following dimensional relationships exist for the stator 14. Designating the length of the stator (as measured along the axial direction of the rotor 10) as Lam, the width of each pole face of the stator poles (also as measured along the rotor axis direction) as Las, the pitch of the stator pole groups (i.e., the distance between the centers of a pair of mutually adjacent stator pole groups, as measured along the rotor axis direction, which is ⅓ of the effective electromagnetic length of the brushless motor 100 along the rotor axis direction) as Lap, the value of Las is made less than Lap. Lam is made approximately 3 times Lap, and Las is made less than Lam/3. In that way, it is ensured that the poles 19, 20, 21 of the respective stator pole groups do not overlap along the rotor axis direction, so that there is no mutual interference between respective stator pole groups around the circumferential direction, while the construction of a stator having a large number of stator poles can be simple, and so it becomes possible to utilize a large number of stator poles to thereby obtain increased output torque from the motor.

If the brushless motor 100 were to be converted to a 2-phase motor, i.e., with the three stator pole groups shown in FIG. 3 being replaced by only two stator pole groups, then the value of Lam would be made approximately twice the value of the pitch Lap, and the value of Las would be made less than Lam/2. Similarly, in the case of a 4-phase brushless motor, Lam would be approximately four times the value of Lap, and Las would be less than Lam/4.

In the case of the stator pole groups shown in the examples of FIGS. 15 to 19 above, the width Las of the pole face of each stator pole is made greater than the pitch Lap of the stator pole groups, with each measured along the rotor axis direction (i.e., Las>Lap), in order to increase the rate of angular rotation of magnetic flux through the stator poles. With the examples of each of FIGS. 15, 16 and 17, the value of Las is made three times that of Lap (Las=3×Lap), while with the examples of each of FIGS. 18 and 19, the value of Las is made twice that of Lap (Las=2×Lap). In that way, by increasing the axial length Las of each stator pole, the amount of magnetic flux acting on each stator pole is increased, so that a higher level of torque can be generated by the motor.

If Las is made greater than Lap, the stator configuration tends to become rather complex. However a correspondingly higher level of output torque can be obtained.

If the above embodiment of a brushless motor 100 is to be made small in size, then the magnetic members constituting the stator 14 can for example be formed by being cut out of steel plate, or formed by machining. If the magnetic members are initially formed into predetermined shapes by being press-cut from magnetic steel plate, the motor windings (e.g., U, V, W-phase stator windings, etc) can then be formed thereon, and the magnetic members can then be bent into their required final shapes. Hence, such a brushless motor can be manufactured by a simple process, and a low-cost, compact brushless motor can be produced.

The above embodiment of a brushless motor 100 has been described for the case of utilizing stator windings that are respective loop-configuration windings having a substantially annular shape, e.g., as shown in FIGS. 1, 9 and 10. However in general, the shape of each stator winding can be adapted in accordance with the shapes of the magnetic members constituting the stator of the motor and based upon considerations of available space. For example, each stator winding may be formed with concave or convex portions extending radially, or along the direction of the rotor axis. Specifically, from considerations of design of a particular motor, one or more parts of each winding may be formed with curved convex or concave portions, or with right-angled transitions in shape, etc., with similar results being obtainable to those described above for the case of using annular-configuration stator windings.

Figure 38:
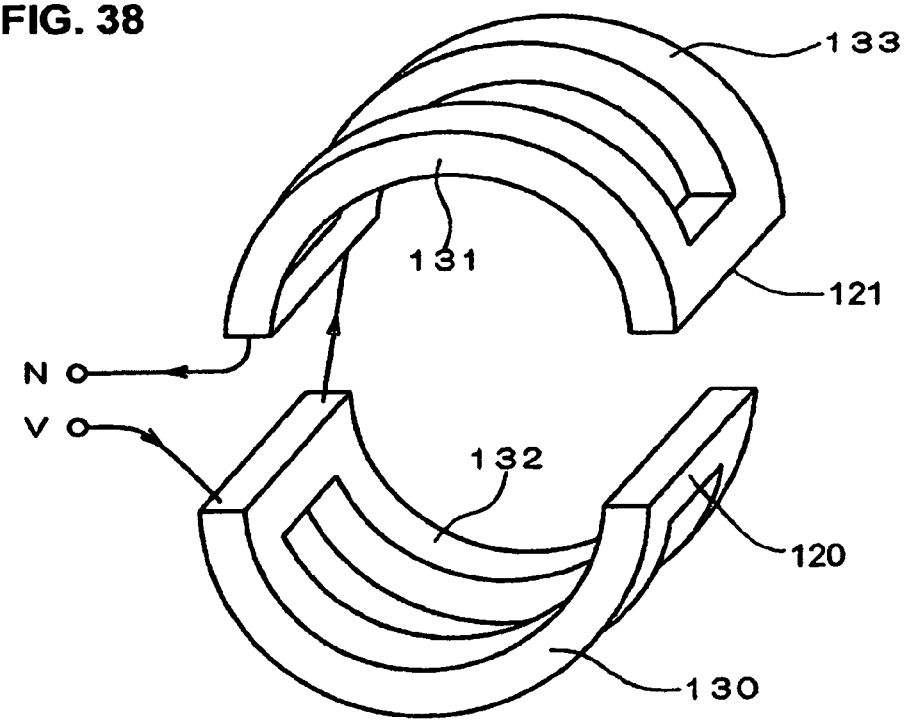
FIG. 38 is a an oblique view of a pair of interconnected loop-configuration stator windings, each partially extending along the rotor axis direction, which perform the function of a pair of circumferentially disposed loop-configuration stator winding.

As an alternative form, one or more of the stator windings may be formed as a loop that extends partially along the rotor axis direction and partially around the circumferential direction, such that the rotor axis does not pass through the central opening in the loop. This as illustrated in the example of FIG. 38. Here, the two V-phase stator windings 16, 17 shown in FIGS. 4 and 5, i.e., two loop-configuration windings through which currents of opposite direction and identical amplitude are passed as described hereinabove, are replaced by two loop-configuration windings 120 and 121. As shown, each of the windings 120, 121 has been initially formed as a substantially rectangular-shape loop, which has been bent into an approximately semi-circular configuration, so that when mounted on the stator core, each of the windings 120, 121 extends partially along the rotor axis direction and partially around the circumferential direction, with the windings 120, 121 being positioned diametrically opposing in relation to the rotor axis.

With respect to electromagnetic action, the partially circumferentially extending portions 130, 131 of the winding 120, 121 respectively, in combination, correspond to the V-phase winding 16 shown in FIGS. 4, 5, while the partially circumferentially extending portions 132, 133, in combination, correspond to the V-phase winding 17.

With such an arrangement, the central apertures in the windings 120, 121 can be disposed such that the V-phase stator poles protrude through these.

It would be possible to extend the above principle, e.g., to further divide each of the windings 120, 121 into a plurality of windings having a basically similar configuration to the windings 120, 121.

It would be possible to replace each of the stator windings that are located adjacent the end faces of the stator in a similar manner, e.g., the U and W-phase windings. However that would result in increased weight, since more copper would be required to form each of these stator windings, by comparison with the use of an annular loop configuration.

It would be possible to dispose a plurality of brushless motors according to the present invention, located mutually adjacent, with their windings mutually interconnected. For example, the motors could be oriented with their rotor axes oriented along the same direction and the shafts linked together, or the motors could be disposed side-by-side. In the latter case, it would be necessary to provide gears or drive belts, etc., to mechanically couple the respective rotor shafts of the various motors.

Furthermore, the magnetic members constituting the stator can be formed with concave or concave shaped portions, as required to provide spaces for the connecting leads of the motor windings. Alternatively, through-holes can be formed in the magnetic members, to permit passage of such connecting leads. As a further alternative, part of the stator poles could be omitted, to provide such space, although this would result in a certain amount of lowering of the output power available from the motor.

Various alternative configurations could be envisaged for a brushless motor according to the present invention. For example, the stator could be disposed in the interior of the motor, surrounded by the rotor, i.e., the motor could have an outer-rotor configuration.

In that case, a reduction could be achieved in the amount of copper required to constitute the windings, and also a reduction in the copper losses of the motor. However the stator magnetic circuit becomes rather complex, with such a configuration. On the other hand, it becomes easier to provide space in the interior of the motor, and the radius of the air gap becomes larger, so that a high level of field flux can be produced, although these advantages must be balanced against the disadvantages that the overall configuration of the rotor is complicated, and that the rotor inertia will be large.

It would also be possible to orient the stator obliquely with respect to the rotor shaft. In particular, if the stator and rotor are respectively formed such that the air gap between them is of tapered shape, then it becomes possible to use a separate apparatus to change the relative positions of the stator and rotor (by displacement along the direction of the rotor axis), so that the length of the air gap can be arbitrarily adjusted. In that way, control of the field flux can be performed, to thereby control the output power of the motor.

One method of cancelling out the aforementioned magnetizing force that acts along the rotor axis direction, with a brushless motor according to the present invention, is to configure the motor as an integrated combination of two brushless motors that are linked along the rotor axis (e.g., sharing a common rotor shaft), with these two motors having their respective stator windings connected such that the magnetizing force acting along the rotor axis direction that results from one of the motors is cancelled by the magnetizing force acting along the rotor axis direction that results from the other one of the motors. That is to say, the two motors are arranged such as to produce respective stator winding magnetic fields that are of opposite directions.

Figure 39:
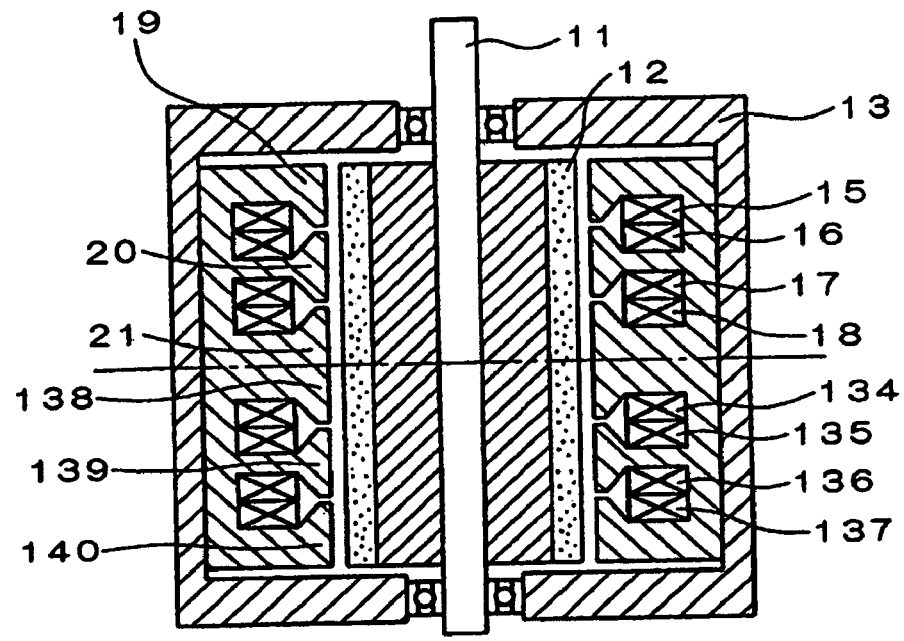
FIG. 39 is a cross-sectional view, taken in a plane passing through the rotor axis, of a combination of two brushless motors having a common rotor shaft and symmetrically opposite polarities of respective stator winding magnetic fields.

A specific example of this is shown in FIG. 39, in which the stator winding 137 is connected in series with the U-phase winding 15, but is wound in the opposite direction to the U-phase winding 15, the stator winding 136 is similarly connected in series with the V-phase winding 16, but wound in the opposite direction, the stator winding 135 is connected in series with the V-phase winding 17, but wound in the opposite direction, and the stator winding 134 is connected in series with the W-phase winding 18, but wound in the opposite direction. As can be understood from FIG. 39, this arrangement is equivalent to two motors having a common rotor, with the respective U-phase windings, the respective V-phase windings and the respective W-phase windings of the two motors each being at symmetrically opposed positions, with respect to the centrally disposed chain line that is drawn at right angles to the rotor axis direction in FIG. 39, and with each of these pairs of windings having respectively opposite directions of current flow. As a result, the total amount of magnetic force acting along the rotor shaft 11 is zero.

That is to say, the amounts of magnetic flux produced by the stator poles 19 and 140 in FIG. 39 are identical in magnitude but of opposite direction, and this is also true for the stator poles 20 and 139, and for the stator poles 21 and 138.

It should be noted that it would be equally possible to combine the stator poles 21 and 138 into a single stator pole. In addition, various other ways of combining the windings 134, 135, 136, 137, etc., as U, V, W stator windings could be envisaged, so that various different configurations are possible.

With the example of FIG. 39, two motors have their respective stators combined into a single unit, and also their respective rotors combined into a single unit. It would be equally possible to combine a greater number of brushless motors, each of identical configuration. In particular in the case of combining two motors which are disposed along a common rotor axis direction, with respective magnetic fields produced by the two motors being of opposite direction and symmetrically opposed with respect to an interface between the two motors (i.e., as indicated by the central chain line in the example of FIG. 39), it would be possible to link the respectively stator magnetic paths, or to link the respective rotor magnetic paths of the two motors.

As a further alternative, two brushless motors could be configured as a combination of an outer motor and an inner motor, with the latter disposed in a coaxial relationship with the outer motor. In that case, the outer motor could be of inner-rotor configuration, while the inner motor could be of outer-rotor configuration, with the respective rotors disposed mutually adjacent, so that the rotors could be connected to one another, or combined into a single unit.

Use of a combination of a plurality of brushless motors has the advantage of enabling high levels of output torque and output power to be achieved.

It should further be noted that although various configurations for the rotor of a brushless motor have been described above, such as those of FIGS. 22 to 27, on the assumption that the rotor poles are implemented by permanent magnets, it would be equally possible to apply the principles described to a synchronous AC motor utilizing electromagnetic rotor poles, i.e., having excitation windings for the rotor poles.

Types of control apparatus for a brushless motor according to the present invention have been described above which operate by deriving values through calculations that are performed based on equations (29) and (30), etc. However it should be noted that it would be equally possible to measure respective values of output torque that are produced by a brushless motor under various different combinations of values of supply current and speed of rotation, to thereby obtain corresponding amounts of error with respect to required values of torque, and to store the information thus obtained. That information can then be used in controlling such a motor, i.e., with a value of supply current being established, in relation to a required value of torque, such as to compensate for the corresponding amount of (known) error.

Moreover, as an alternative to the methods described hereinabove for reducing torque ripple, it would be possible to appropriately adjust the amplitudes of the phase currents supplied to the respective (U, V, W) stator windings at each angular position of the rotor at which the actual output torque differs from the required value of torque. That is to say, if for example the output torque is greater than the required torque, at some angular position of the rotor, the supply currents of the respective phases could each be decreased by an identical amount.

As a practical arrangement, respective values of torque that are actually produced at various different angular positions of the rotor could be measured beforehand and stored in a memory, in the form of a table, in conjunction with corresponding values of speed of rotation and supply current. The stored information can then be used (i.e., in conjunction with a rotational speed sensor) to control the amplitudes of supply current of the stator windings, to obtain a required value of output torque at any specific speed of rotation, while reducing the level of torque ripple.

It should thus be understood that such a method of control of a brushless motor, as well as methods whereby calculations are performed in accordance with the equations (28), (30), etc., to determine appropriate values of supply current amplitude during operation of the motor, or whereby values derived from such calculations are stored beforehand in a table memory (i.e., together with corresponding combinations of supply current amplitude and speed of rotation) to be subsequently used during operation of the motor, all fall within the scope of the present invention.

What is claimed is:

1. A synchronous AC motor comprising:
a rotor having a plurality of magnetic poles, with alternating N (north) poles and S (south) poles circumferentially disposed at equal intervals;
a stator having K stator pole groups, where K is a plural integer, each said stator pole group formed circumferentially on said stator pole group formed circumferentially on said stator and each comprising a plurality of stator poles, with each of the adjacent pairs of said K stator pole groups mutually differing in circumferential position by an identical amount; and
a plurality of loop-configuration stator windings formed circumferentially on said stator, with each said loop-configuration stator winding disposed immediately adjacent to a corresponding one of said K stator pole groups, with respect to an axial direction of said rotor;
wherein each of said stator pole groups has a corresponding pair of said loop-configuration stator windings disposed immediately adjacent thereto and on respectively opposing sides thereof, with respect to said rotor axis direction.

2. A synchronous AC motor according to claim 1, wherein said rotor comprises a plurality of permanent magnets mounted externally thereon, circumferentially disposed at equal intervals, with respective magnetic poles of said permanent magnets constituting said alternating N and S poles of said rotor.

3. A synchronous AC motor according to claim 1, wherein said rotor comprises a plurality of permanent magnets mounted within said rotor, circumferentially disposed at equal intervals, with respective magnetic poles of said permanent magnets acting to produce said alternating N and S poles of said rotor at a peripheral surface of said rotor.

4. A synchronous AC motor according to claim 1, wherein at least one of said stator and said rotor comprises at least a part thereof that is manufactured by a molding process applied to a metal powder that is a soft magnetic material.

5. A synchronous AC motor according to claim 1, wherein said stator poles are disposed at respective circumferential locations whereby a specific amount of displacement in the circumferential direction exists between each adjacent pair of said K stator pole groups, with said specific amount of displacement being equivalent to an electrical angle of 360/K degrees.

6. A control apparatus for controlling a synchronous AC motor as claimed in claim 1, said control apparatus controlling an amplitude I of each of respective currents that flow in said plurality of loop-configuration stator windings to a value whereby a total of respective values of torque T that are produced by said K stator pole groups becomes equal to a specific command value of torque, wherein said control apparatus comprises means for calculating each of said respective values of torque T as (W×E×I), where E is the rate of angular rotation of magnetic flux that is linked to said each stator pole group, and W is a total number of turns of said loop-configuration stator windings corresponding to said each stator pole group.

7. A synchronous AC motor according to claim 1, wherein at least one of said pairs of loop-configuration stator windings respectively corresponding to said stator pole groups comprises a series-connected combination of two loop-configuration windings, each formed as a single annular loop extending around a circumference of said stator, coaxial with said rotor.

8. A synchronous AC motor according to claim 1, wherein at least one of said pairs of loop-configuration stator windings respectively corresponding to said stator pole groups comprises a series-connected combination of two loop-configuration windings, each formed as a loop that is shaped with portions extending partially around a circumferential direction of said stator and portions extending along an axial direction of said rotor, with said two loop-configuration windings disposed mutually opposing with respect to a central axis of said rotor.

9. A combination of a plurality of synchronous AC motors, each as claim 1, mutually linked to be capable of driving a single load.

10. A combination of a plurality of synchronous AC motors as claimed in claim 9, wherein at least part of respective stator windings of said plurality of synchronous AC motors are mutually connected.

11. A synchronous AC motor according to claim 1, wherein said loop-configuration stator windings are formed with respective shapes which are determined in accordance with positions and shapes of magnetic members constituting a stator core of said stator, and in accordance with amounts and locations of space available within said stator core for accommodating said stator windings.

12. A synchronous AC motor according to claim 11, wherein at least one of said stator windings is formed with a portion thereof extending substantially radially with respect to said axial direction.

13. A synchronous AC motor according to claim 11, wherein at least one of said stator windings is formed with a portion thereof extending substantially along said axial direction.

14. A synchronous AC motor according to claim 11, wherein at least one of said stator windings is formed with a portion thereof having a right-angle bend.

15. A synchronous AC motor according to claim 11, wherein at least one of said stator windings is formed with a portion thereof that protrudes radially outward, in a convex shape.

16. A synchronous AC motor according to claim 11, wherein at least one of said stator windings is formed with a portion thereof that protrudes in an axial direction, in a convex shape.

17. A synchronous AC motor according to claim 11, wherein at least one of said stator windings is formed with a portion thereof that protrudes radially inward, in a concave shape.

18. A synchronous AC motor according to claim 11, wherein at least one of said stator windings is formed with a portion thereof that protrudes in an axial direction, in a convex shape.

19. A synchronous AC motor comprising:
- a rotor having a plurality of magnetic poles, with alternating N (north) poles and S (south) poles circumferentially disposed at equal intervals;
- a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
- a plurality of loop-configuration stator windings formed circumferentially on said stator, with each said loop-configuration stator winding disposed immediately adjacent to a corresponding one of said K stator pole groups, with respect to an axial direction of said rotor; wherein:
- a pair of outermost ones of said stator pole groups, respectively located at opposing outer ends of said stator with respect to said rotor axis direction, each have a corresponding one of said loop-configuration stator windings disposed immediately adjacent thereto, with each said corresponding loop-configuration stator winding located on an opposite side of said each outermost loop-configuration stator winding from an outer end of said stator, with respect to said rotor axis direction;
- each of said stator pole groups other than said outermost stator pole groups has a corresponding pair of said loop-configuration stator windings disposed immediately adjacent thereto and on respectively opposing sides thereof, with respect to said rotor axis direction; and
- currents of mutually opposite direction are passed through said pair of loop-configuration stator windings that are located on opposing sides of a stator pole group.

20. A synchronous AC motor comprising:
- a rotor having a plurality of magnetic poles, with alternating N (north) poles and S (south) poles circumferentially disposed at equal intervals;
- a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
- a plurality of loop-configuration stator windings formed circumferentially on said stator, with each said loop-configuration stator winding disposed immediately adjacent to a corresponding one of said K stator pole groups, with respect to an axial direction of said rotor;
- wherein each of said loop-configuration stator windings is disposed between a corresponding pair of mutually adjacent ones of said stator pole groups.

21. A control apparatus for controlling a synchronous AC motor as claimed in claim 20, said control apparatus controlling an amplitude I of each of (K−1) currents that respectively flow in said plurality of loop-configuration stator windings to a value whereby a total of respective values of torque T that are produced by said K stator pole groups becomes equal to a specific command value of torque, wherein said control apparatus comprises means for calculating respective values of said torque T for each of said K stator pole groups, as W×E×I, where E is the rate of angular rotation of magnetic flux that is linked to said each stator pole group and W is a number of turns of a loop-configuration stator winding disposed adjacent to said each stator pole group.

22. A synchronous AC motor comprising:
- a rotor having a plurality of magnetic poles, with alternating N (north) poles and S (south) poles circumferentially disposed at equal intervals:
- a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
- a plurality of loop-configuration stator windings formed circumferentially on said stator, with each said loop-configuration stator winding disposed immediately adjacent to a corresponding one of said K stator pole groups, with respect to an axial direction of said rotor;
- wherein said loop-configuration stator windings are adapted to be driven by K-phase AC voltages, and wherein loop-configuration stator windings corresponding to respectively different ones of said K stator pole groups are adapted to be driven by AC voltages that respectively differ in phase angle by 360/K degrees.

23. A synchronous AC motor comprising:
- a rotor having a plurality of magnetic poles, with alternating N (north) poles and S (south) poles circumferentially disposed at equal intervals;
- a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
- a plurality of loop-configuration stator windings formed circumferentially on said stator, with each said loop-configuration stator winding disposed immediately adjacent to a corresponding one of said K stator pole groups, with respect to an axial direction of said rotor;
- wherein said stator poles respectively protrude from a circumferential surface of said stator, and wherein said stator comprises a plurality of pole pieces disposed on said circumferential surface at locations thereon which are not occupied by said stator poles.

24. A synchronous AC motor comprising:
- a rotor having a plurality of magnetic poles, with alternating N (north) poles and S (south) poles circumferentially disposed at equal intervals;
- a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
- a plurality of loop-configuration stator windings formed circumferentially on said stator, with each said loop-configuration stator winding disposed immediately adjacent to a corresponding one of said K stator pole groups, with respect to an axial direction of said rotor;

wherein, within each of said stator pole groups, respective pole faces of said stator poles are formed in specific shapes for rendering waveforms of respective unit voltages of said stator pole groups substantially mutually identical and for rendering respective amplitudes of said unit voltages substantially mutually identical, where each said unit voltage is a rate of angular rotation of magnetic flux that is linked to said each stator pole group, and for maintaining a mutual difference in phase between said stator pole groups that is substantially equal to an electrical angle of 360/K degrees.

25. A synchronous AC motor comprising:
a rotor having a plurality of magnetic poles, with alternating N (north) poles and S (south) poles circumferentially disposed at equal intervals;
a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
a plurality of loop-configuration stator windings formed circumferentially on said stator, with each said loop-configuration stator winding disposed immediately adjacent to a corresponding one of said K stator pole groups, with respect to an axial direction of said rotor;
wherein, designating an order of a torque ripple of said synchronous AC motor that is to be reduced as m where m is a plurality integer, within each of said K stator pole groups, and classifying said stator poles of said each stator pole group into n sub-groups, a specific amount of relative position displacement in said circumferential direction of said stator is established between respective ones of said sub-groups, with said specific amount of relative position displacement being equivalent to an integral multiple of 360/(m×n) degrees of electrical angle.

26. A synchronous AC motor comprising:
a rotor having a plurality of magnetic poles, with alternating N (north) poles and S (south) poles circumferentially disposed at equal intervals;
a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
a plurality of loop-configuration stator windings formed circumferentially on said stator, with each said loop-configuration stator winding disposed immediately adjacent to a corresponding one of said K stator pole groups, with respect to an axial direction of said rotor;
wherein, designating an order of a torque ripple of said synchronous AC motor that is to be reduced as m where m is a plurality integer, with said K poles of said rotor classified into n sub-groups and said S poles of said rotor classified into n sub-groups, a specific amount of relative position displacement with respect to a circumferential direction on said rotor is established between adjacent ones of said sub-groups, with said specific amount of relative position displacement being equivalent to a phase angle that is an integral multiple of 360/(m×n) degrees.

27. A synchronous AC motor comprising:
a rotor having a plurality of magnetic poles, with alternating N (north) poles and S (south) poles circumferentially disposed at equal intervals;
a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
a plurality of loop-configuration stator windings formed circumferentially on said stator, with each said loop-configuration stator winding disposed immediately adjacent to a corresponding one of said K stator pole groups, with respect to an axial direction of said rotor;
comprising an auxiliary winding disposed closely adjacent to a shaft of said rotor, wherein an AC current is supplied to said auxiliary winding having appropriate values of frequency, phase and amplitude for producing a magnetizing force in said auxiliary winding acting along an axial direction of said shaft to counteract a magnetizing force acting along said axial direction that is produced by a combination of respective current flows through said loop-configuration stator windings.

28. A synchronous AC motor comprising:
a rotor having a plurality of magnetic poles, with alternating N (north) poles and S (south) poles circumferentially disposed at equal intervals;
a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
a plurality of loop-configuration stator windings formed circumferentially on said stator, with each said loop-configuration stator winding disposed immediately adjacent to a corresponding one of said K stator pole groups, with respect to an axial direction of said rotor;
wherein each of said stator poles has a pole face having a dimension as measured along an axial direction of said rotor that is longer than a distance between respective center positions of mutually adjacent ones of said stator pole groups, as measured along said axial direction.

29. A synchronous AC motor comprising:
a rotor having a plurality of magnetic poles, with alternating N (north) poles and S (south) poles circumferentially disposed at equal intervals;
a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
a plurality of loop-configuration stator windings formed circumferentially on said stator, with each said loop-configuration stator winding disposed immediately adjacent to a corresponding one of said K stator pole groups, with respect to an axial direction of said rotor;
wherein each of said loop-configuration stator windings is formed as a single annular loop extending around a circumference of said stator, coaxial with said rotor.

30. A synchronous AC motor comprising:
a rotor having a plurality of magnetic poles, with alternating N (north) poles and S (south) poles circumferentially disposed at equal intervals;
a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and
a plurality of loop-configuration stator windings formed circumferentially on said stator, with each said loop-configuration stator winding disposed immediately adjacent to a corresponding one of said K stator pole groups, with respect to an axial direction of said rotor;

wherein at least one of said loop-configuration stator windings is formed as a loop that is shaped with portions extending partially around a circumferential direction of said stator and portions extending along an axial direction of said rotor.

31. A K-phase synchronous AC motor, where K is a plural integer, comprising:

a rotor having a plurality of magnetic poles, with alternating N (north) poles and S (south) poles circumferentially disposed at equal intervals;

a stator having K stator pole groups, each said stator pole group formed circumferentially on said stator and each comprising a plurality of stator poles, with each of adjacent pairs of said K stator pole groups mutually differing in circumferential position by an identical amount; and a plurality of loop-configuration stator windings, corresponding to respective ones of said K phases, formed circumferentially on said stator;

wherein:

at least one of said loop-configuration stator windings comprises first and second modified loop windings that are of identical configuration and connected in series, each of said modified loop windings comprising two substantially semicircular portions that are oriented circumferentially on said stator and two linear portions that respectively extend parallel to an axis of said stator and connect respective ends of said substantially semicircular portions, said substantially semicircular portions and linear portions thereby enclosing a central aperture of said modified loop winding;

said first and second modified loop windings are located directly opposing one another with respect to said axis of said stator; and each of said first and second modified loop windings is disposed with a plurality of said magnetic poles of a corresponding one of said pole groups protruding through said central aperture thereof.

32. An integrated combination of two synchronous AC motors, respectively disposed on opposite sides of a boundary plane and sharing a common rotor axis, each of said synchronous AC motors comprising a rotor having a plurality of magnetic poles, with alternating N (north) poles and S (south) poles circumferentially disposed at equal intervals, said rotor coupled to rotate together with a rotor of the other one of said synchronous AC motors, a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount, and a plurality of loop-configuration stator windings formed circumferentially on said stator, with each said loop-configuration stator winding disposed immediately adjacent to a corresponding one of said K stator pole groups, with respect to an axial direction of said rotor;

wherein respective configurations and positions of said loop-configuration stator windings, said stator poles and said rotor poles of said synchronous AC motors, and respective directions of current flow in said windings of said synchronous AC motors, are predetermined to render respective magnetic circuits formed by said synchronous AC motors symmetric with respect to said boundary plane.

33. A integrated combination of synchronous AC motors as claimed in claim 32, wherein each of said stator windings corresponds to one of a plurality of phases of a polyphase AC supply voltage of said two synchronous AC motors, and wherein for each stator winding of a first one of said synchronous AC motors, corresponding to a specific one of said supply voltage phases, a stator winding of said second synchronous AC motor, corresponding to said specific supply voltage phase, is located symmetrically opposite said stator winding of the first synchronous AC motor with respect to said boundary plane, and is adapted to be supplied with a drive current flowing in an opposite direction to that of said stator winding of the first synchronous AC motor.

34. An integrated combination of synchronous AC motors as claimed in claim 32, wherein said respective rotors of said first and second synchronous AC motors are combined as a single rotor.

35. An integrated combination of synchronous AC motors as claimed in claim 34, comprising an annular-configuration stator pole group which is bisected by said boundary plane, and functions as respective stator pole groups of said first synchronous AC motor and of said second synchronous AC motor.

36. A synchronous AC motor comprising:

a rotor having a plurality of magnetic poles, with alternating N (north) poles and S (south) poles circumferentially disposed at equal intervals;

a stator having K stator pole groups, where K is a plural integer, each said stator pole group formed circumferentially on said stator and each comprising a plurality of stator poles, with each of adjacent pairs of said K stator pole groups mutually differing in circumferential position by an identical amount; and (K−1) loop-configuration stator windings formed circumferentially on said stator, with the entirety of each said loop-configuration stator winding disposed between a corresponding pair of mutually adjacent ones of said stator pole groups.

37. A synchronous AC motor according to claim 36, wherein said motor is a 3-phase synchronous AC motor, and said loop-configuration stator windings comprise a first loop-configuration stator winding disposed between a first axially outward-disposed one of said stator pole groups and an axially inward-disposed one of said stator pole groups, and a second loop-configuration stator winding disposed between a second axially outward-disposed one of said stator pole groups and said axially inward-disposed one of said stator pole groups.

38. A synchronous AC motor according to claim 37, wherein said motor is adapted to be driven by a 3-phase AC power voltage, supplied to said motor as respective phase voltages on first, second and third power supply lines, and wherein:

said first power supply line is connected to a first end of said first loop-configuration stator winding, said second power supply line is connected to a first end of said second loop-configuration stator winding, and said third power supply line is connected in common to a second end of said first loop-configuration stator winding and a second end of said second loop-configuration stator winding.

39. A synchronous AC motor according to claim 38, wherein said 3-phase AC power voltage is produced by a power inverter apparatus.

* * * * *